US007003730B2

(12) United States Patent
Dettinger et al.

(10) Patent No.: US 7,003,730 B2
(45) Date of Patent: Feb. 21, 2006

(54) GRAPHICAL USER INTERFACE TO BUILD EVENT-BASED DYNAMIC SEARCHES OR QUERIES USING EVENT PROFILES

(75) Inventors: Richard Dean Dettinger, Rochester, MN (US); Peter John Johnson, Rochester, MN (US); Jeffrey Wayne Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 10/094,531

(22) Filed: Mar. 8, 2002

(65) Prior Publication Data

US 2003/0169284 A1  Sep. 11, 2003

(51) Int. Cl.
*G06F 3/00* (2006.01)
*G06F 17/30* (2006.01)

(52) U.S. Cl. .................. 715/764; 715/810; 715/968; 707/3; 707/104.1

(58) Field of Classification Search ............... 715/808, 715/810, 835, 841, 843, 846, 853–855, 968, 715/764; 707/3, 10, 100, 102, 103 R, 104.1
See application file for complete search history.

(56) References Cited

U.S. PATENT DOCUMENTS

| 6,233,570 | B1 * | 5/2001 | Horvitz et al. ............. 706/11 |
| 6,341,277 | B1 * | 1/2002 | Coden et al. .............. 707/2 |
| 6,408,291 | B1 * | 6/2002 | Skeen et al. .............. 707/2 |
| 6,484,164 | B1 * | 11/2002 | Nikolovska et al. ......... 707/3 |
| 6,499,026 | B1 * | 12/2002 | Rivette et al. ............ 707/2 |
| 6,658,410 | B1 * | 12/2003 | Sakamaki et al. .......... 707/4 |
| 6,711,563 | B1 * | 3/2004 | Koskas ................... 707/3 |
| 6,725,227 | B1 * | 4/2004 | Li ...................... 707/102 |

OTHER PUBLICATIONS

Dettinger, et al., Patent Application ROC920020061 US1, U.S. Appl. No. 10/083,073, "Graphical User Interface to Building Queries with Hierarchical Conditions", filed Feb. 26, 2002.

* cited by examiner

*Primary Examiner*—X. L. Bautista
(74) *Attorney, Agent, or Firm*—Moser, Patterson & Sheridan, LLP

(57) ABSTRACT

The present invention generally provides methods, systems and articles of manufacture for programmatically providing a user interface for creating queries. In one embodiment, the graphical user interface comprises (i) a region for displaying conditions of a user-defined query; and (ii) a graphical element for initiating a process of applying an event profile to a first condition of the query, whereby results returned by execution of the query are restricted to those for which the first condition and a second condition defined by the event profile are contemporaneously true.

59 Claims, 17 Drawing Sheets

Event Profile - Add a Condition

◉ Age Range: ← 1500

1505  Lower Limit: [      ] ← 1506

Upper Limit: [      ] ← 1508

○ Geographic Code: ← 1500

1510  [                    ]

○ Geographic Location:

1515  City: [            ]

County: [              ] — 1517

State: [(none) ▽]

Country: [United States ▽]

○ Zip Codes:

1520  [                              ]

○ Clinical Encounter site:

1525  Site: [Rochester-Clinic]  Desk/Area [Desk C]  [Browse]

○ Date Range:

1530  Begin Date: [            ]

End Date: [            ]
1535
  [OK] [Cancel]

Save Event Profile

Name: ⟵ 1705

Description: ⟵ 1710

☐ Overwrite if an event profile with the same name exists

[OK] [Cancel]
\
1715

Apply Event Profile

Select the profile you would like to apply to the search condition.

| Apply | Event Profile |

⊙ Olmsted County [Details] ⟵ 1805

1810 ⟶  1815 ⟶
[New Profile] [OK] [Cancel]

*Fig. 18*

GRAPHICAL USER INTERFACE TO BUILD EVENT-BASED DYNAMIC SEARCHES OR QUERIES USING EVENT PROFILES

BACKGROUND OF THE INVENTION

1. Field of the Invention

The present invention generally relates to data processing and more particularly to user interfaces for accessing data.

2. Description of the Related Art

Databases are computerized information storage and retrieval systems. The most prevalent type of database is the relational database, a tabular database in which data is defined so that it can be reorganized and accessed in a number of different ways.

Regardless of the particular architecture, a requesting entity (e.g., an application or the operating system) demands access to a specified database by issuing a database access request, or query. Such queries may include, for instance, simple catalog lookup requests or transactions and combinations of transactions that operate to read, change and add specified records in the database. The term "query" denominates a set of commands for retrieving data from a stored database. Queries take the form of a command language that lets programmers and programs select, insert, update, find out the location of data, and so forth. One well-known high-level query language is the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates.

One problem with accessing a database using a query language is that the interface for specifying a search query is commonly a text interface for which users require a degree of proficiency with the query language. Users often create syntactically incorrect queries, or if correct, queries which return undesired (i.e., incorrect or useless) results.

In order to facilitate query searches, some systems provide graphical user interfaces (GUIs). A GUI eliminates the need to understand the details of the underlying datastore and simplifies the process of creating a search expression, thereby reducing the necessary training. A typical GUI may allow a user to define a search query over a series of screens. Search criteria may be independently selected to allow for dynamic building of queries. For example, one GUI may allow a user to find customers according to various independently selectable demographics. Such demographics may include, for example, a state and an age range, each of which are presented in the GUI with an associated check box. Accordingly, by checking the appropriate check boxes and specifying desired values for each of the selected demographics, a customer may build a query based on a state, and age range, or both. One such GUI 100 comprising a State search criterion 102 and an Age Range search criterion 104 is shown in FIG. 1. Illustratively, the query constructed in the GUI 100 will find customers who live in the state of Minnesota and are between the ages of 30 and 40.

One limitation with existing GUIs for building queries is the inability to build event-based queries. Event-based queries are queries or searches that associate a search criterion/criteria (a portion of the overall search) with an event defined by another search criterion/criteria. An example of an event-based query would be a query to find customers who live/lived in the state of Minnesota and at the time they lived in the state of Minnesota were between the ages of 30 and 40. In this case, the "event" is living in the specified state (in this case Minnesota). Simply changing the definition of the Age Range search criterion 104 to mean age at the time the person lived in the specified state is not desirable since it limits the ability of a user to generate a query for finding people currently living in Minnesota and between the age of 30 and 40. Both queries may be valuable for different reasons and, accordingly, a user must be given the flexibility to specify either query.

Therefore, there is a need for a graphical user interface through which event-based queries can be defined.

SUMMARY OF THE INVENTION

The present invention generally is directed to a method, system and article of manufacture for a graphical user interface through which event-based queries can be defined.

One embodiment provides a method of programmatically providing a user interface for creating queries, the method comprising providing graphical user interface content which defines a graphical user interface. In one embodiment, the graphical user interface comprises (i) a region for displaying conditions of a user-defined query; and (ii) a graphical element for initiating a process of applying an event profile to a first condition of the query, whereby results returned by execution of the query are restricted to those for which the first condition and a second condition defined by the event profile are contemporaneously true.

In another embodiment, a method is provided for programmatically providing a user interface for creating queries, comprising generating graphical user interface (GUI) content which, when processed by a GUI-based program, defines a first graphical user interface screen comprising a first graphical element for initiating a process of applying an event profile to a first condition of a user-defined query, whereby results returned by execution of the query are restricted to those for which the first condition and a second condition defined by the event profile are contemporaneously true. In response to a user event activating the first graphical element, graphical user interface (GUI) content is generated which, when processed by the GUI-based program, defines a second graphical user interface screen displaying predefined event profiles available for user selection. In response to a user selection of the event profile from the second graphical user interface screen, graphical user interface (GUI) content is generated which, when processed by the GUI-based program, defines a third graphical user interface screen displaying the query including at least the first condition and the second condition.

Still another embodiment provides a computer-readable medium containing a program which, when executed by a processor, performs the aforementioned methods.

Yet another embodiment provides a computer, comprising a memory containing at least an application; and a processor communicably connected to the memory and which, when executing the application, performs an operation of generating a user interface for creating queries. The operation comprises generating graphical user interface content which defines a graphical user interface, comprising: (i) a region for displaying conditions of a user-defined query; and (ii) a graphical element for initiating a process of applying an event profile to a first condition of the query, whereby results returned by execution of the query are restricted to those for which the first condition and a second condition defined by the event profile are contemporaneously true.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 15 is a graphical user interface screen from which a user may add a condition to an event profile;

FIG. 17 is a graphical user interface in which a user may save an event profile;

FIG. 18 is a graphical user interface from which a user may select and apply an event profile.

DETAILED DESCRIPTION OF THE PREFERRED EMBODIMENTS

The present invention generally is directed to a system, method and article of manufacture for a graphical user interface through which event-based queries can be defined.

Figure 1:
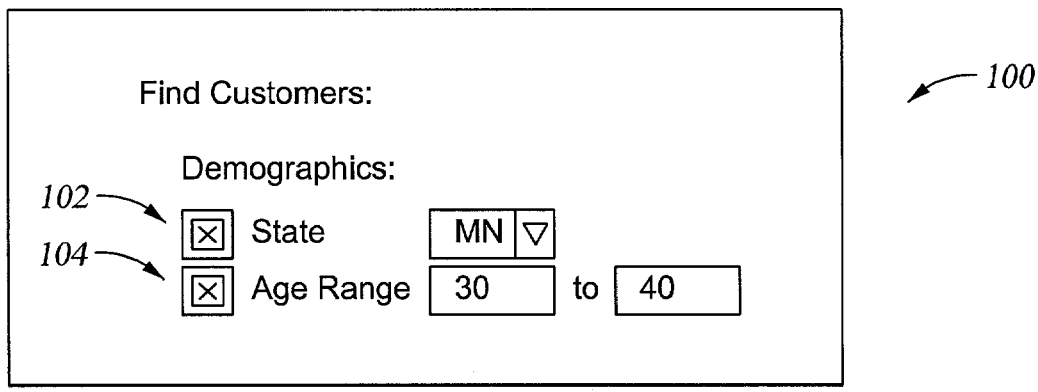
FIG. 1 is a prior art graphical user interface.
Figure 13:
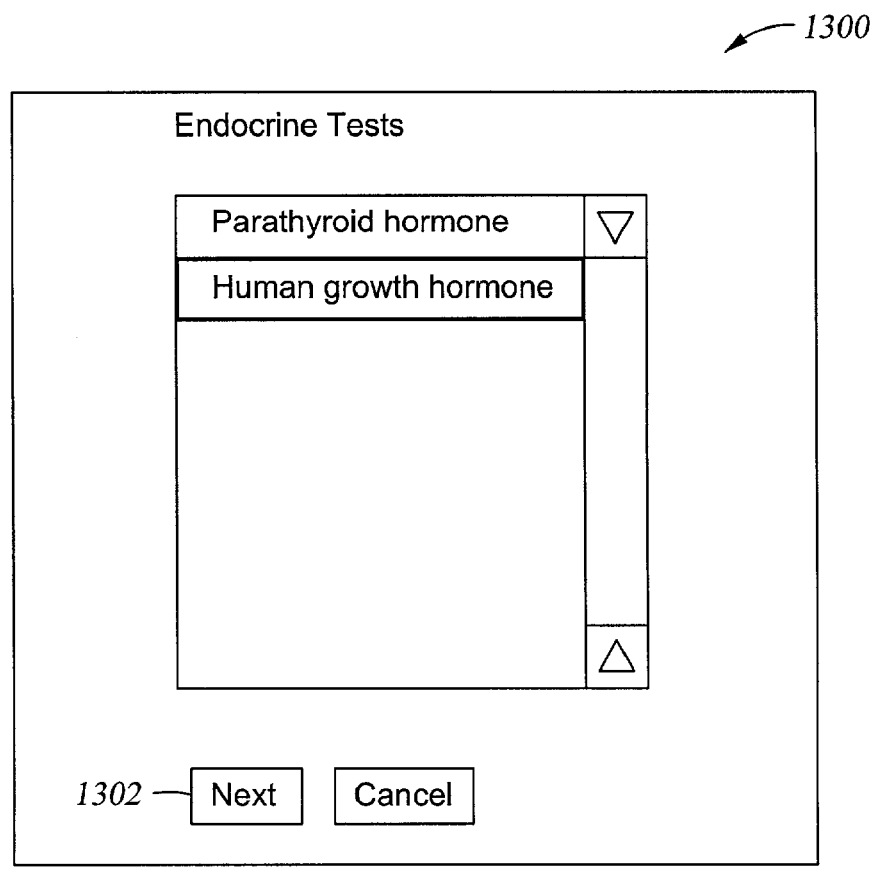
FIG. 13 is a graphical user interface screen from which a user may select a particular endocrine test.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

Figure 2:
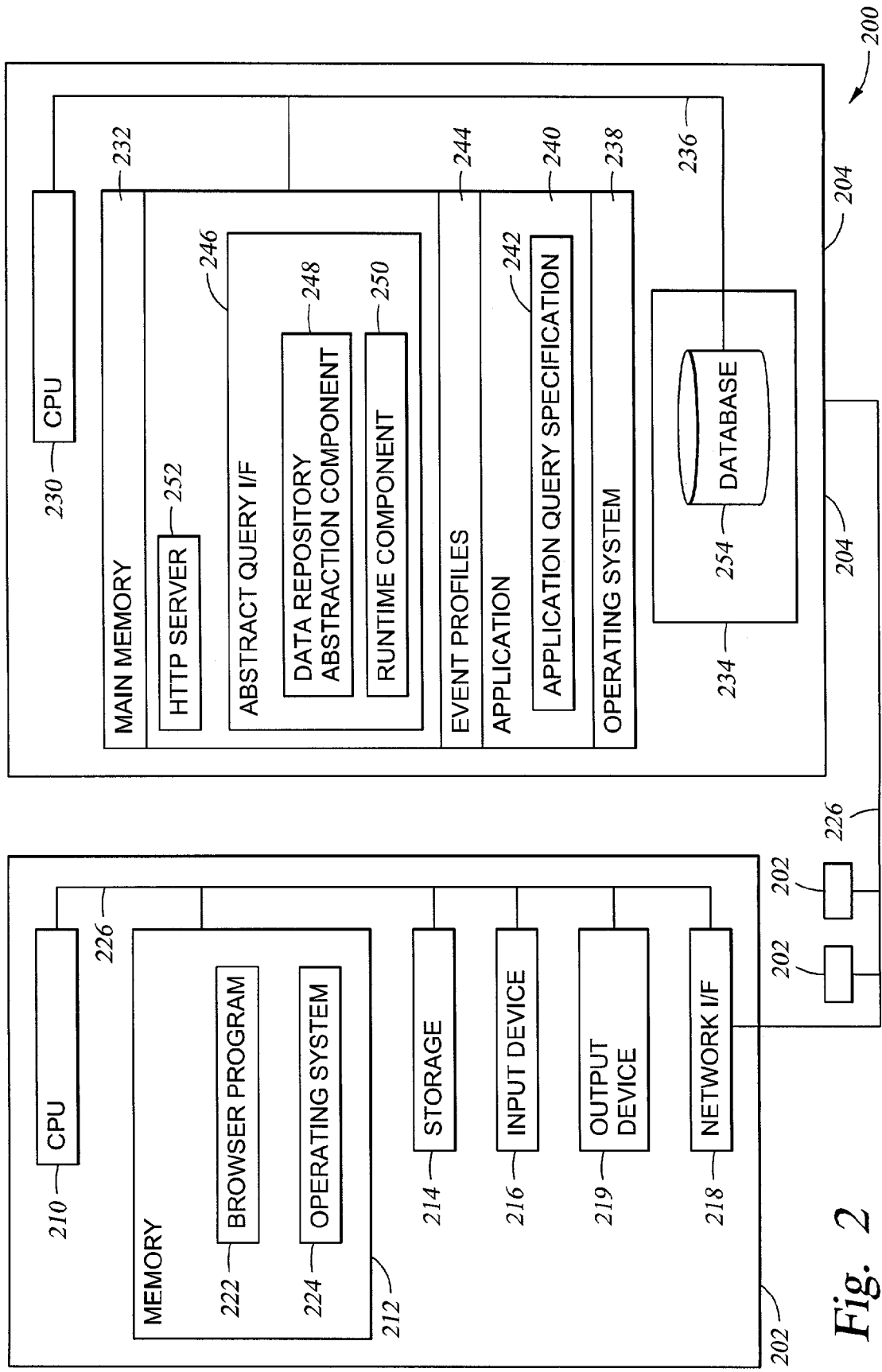
FIG. 2 is a computer system illustratively utilized in accordance with the invention.

FIG. 2 depicts a block diagram of a networked system 200 in which embodiments of the present invention may be implemented. In general, the networked system 200 includes a client (e.g., user's) computer 202 (three such client computers 102 are shown) and at least one server 204 (one such server 204). The client computer 202 and the server computer 204 are connected via a network 226. In general, the network 226 may be a local area network (LAN) and/or a wide area network (WAN). In a particular embodiment, the network 226 is the Internet.

The client computer 202 includes a Central Processing Unit (CPU) 210 connected via a bus 230 to a memory 212, storage 214, an input device 216, an output device 219, and a network interface device 218. The input device 216 can be any device to give input to the client computer 202. For example, a keyboard, keypad, light-pen, touch-screen, trackball, or speech recognition unit, audio/video player, and the like could be used. The output device 219 can be any device to give output to the user, e.g., any conventional display screen. Although shown separately from the input device 216, the output device 219 and input device 216 could be combined. For example, a display screen with an integrated touch-screen, a display with an integrated keyboard, or a speech recognition unit combined with a text speech converter could be used.

The network interface device 218 may be any entry/exit device configured to allow network communications between the client computer 202 and the server computer 204 via the network 226. For example, the network interface device 218 may be a network adapter or other network interface card (NIC).

Storage 214 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 212 and storage 214 could be part of one virtual address space spanning multiple primary and secondary storage devices.

The memory 212 is preferably a random access memory sufficiently large to hold the necessary programming and data structures of the invention. While the memory 212 is shown as a single entity, it should be understood that the memory 212 may in fact comprise a plurality of modules, and that the memory 212 may exist at multiple levels, from high speed registers and caches to lower speed but larger DRAM chips.

Illustratively, the memory 212 contains an operating system 224. Illustrative operating systems, which may be used to advantage, include Linux and Microsoft's Windows®. More generally, any operating system supporting the functions disclosed herein may be used.

The memory 212 is also shown containing a browser program 222 that, when executed on CPU 210, provides support for navigating between the various servers 204 and locating network addresses at one or more of the servers 204. In one embodiment, the browser program 222 includes a web-based Graphical User Interface (GUI), which allows the user to display Hyper Text Markup Language (HTML) information. More generally, however, the browser program 222 may be any GUI-based program capable of rendering the information transmitted from the server computer 204.

The server computer 204 may by physically arranged in a manner similar to the client computer 202. Accordingly, the server computer 204 is shown generally comprising a CPU 230, a memory 232, and a storage device 234, coupled to one another by a bus 236. Memory 232 may be a random access memory sufficiently large to hold the necessary programming and data structures that are located on the server computer 204.

The server computer 204 is generally under the control of an operating system 238 shown residing in memory 232. Examples of the operating system 238 include IBM OS/400®, UNIX, Microsoft Windows®, and the like. More generally, any operating system capable of supporting the functions described herein may be used.

The memory 232 further includes one or more applications 240 and an abstract query interface 246. The applications 240 and the abstract query interface 246 are software products comprising a plurality of instructions that are resident at various times in various memory and storage devices in the computer system 200. When read and executed by one or more processors 230 in the server 204, the applications 240 and the abstract query interface 246 cause the computer system 200 to perform the steps necessary to execute steps or elements embodying the various aspects of the invention. The applications 240 (and more generally, any requesting entity, including the operating system 238) are configured to issue queries against a database 254 (shown in storage 234). The database 254 is representative of any collection of data regardless of the particular physical representation. By way of illustration, the database 254 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 240 are defined according to an application query specification 242 included with each application 240. The queries issued by the applications 240 may be predefined (i.e., hard coded as part of the applications 240) or may be generated in response to input (e.g., user input). In either case, the queries (referred to herein as "abstract queries") are composed using logical fields defined by the abstract query interface 246. In particular, the logical fields used in the abstract queries are defined by a data repository abstraction component 248 of the abstract query interface 246. The abstract queries are executed by a runtime component 250 which transforms the abstract queries into a form consistent with the physical representation of the data contained in the database 254. The application query specification 242 and the abstract query interface 246 are further described with reference to FIG. 3.

In one embodiment, elements of a query are specified by a user through a graphical user interface (GUI). The content of the GUIs is generated by the application(s) 240. In a particular embodiment, the GUI content is hypertext markup language (HTML) content which may be rendered on the client computer systems 202 with the browser program 222. Accordingly, the memory 232 includes a Hypertext Transfer Protocol (http) server process 238 (e.g., a web server) adapted to service requests from the client computer 202. For example, the process 238 may respond to requests to access a data repository 254, which illustratively resides on the server 204. Incoming client requests for data from the data repository 254 invoke an application 240. When executed by the processor 230, the application 240 causes the server computer 204 to perform the steps or elements embodying the various aspects of the invention, including accessing the data repository 254. In one embodiment, the application 240 comprises a plurality of servlets configured to build GUI elements, which are then rendered by the browser program 222. In at least one of the screens of the GUI built by the application 240, the user is given the opportunity to group and ungroup search expressions and/or bind one or more event profiles 244 to a portion of a search expression. Details regarding the event profiles 244 and the inventive GUIs generally will be described below.

For purposes of illustration, aspects of the inventive GUIs have been and will be described with reference to the abstract query interface 246 and the application query specification 242. However, persons skilled in the art will recognize that the GUIs are not so limited and other embodiments do not include the abstract query interface 246 and the application query specification 242. Rather, the queries may be handled in a more conventional manner, with the advantages of the GUIs described herein.

FIG. 2 is merely one hardware/software configuration for the networked client computer 202 and server computer 204. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 238 shown in FIG. 2 is merely illustrative and other embodiments adapted to support any known and unknown protocols are contemplated.

Relational View of Environment

Figure 3A:
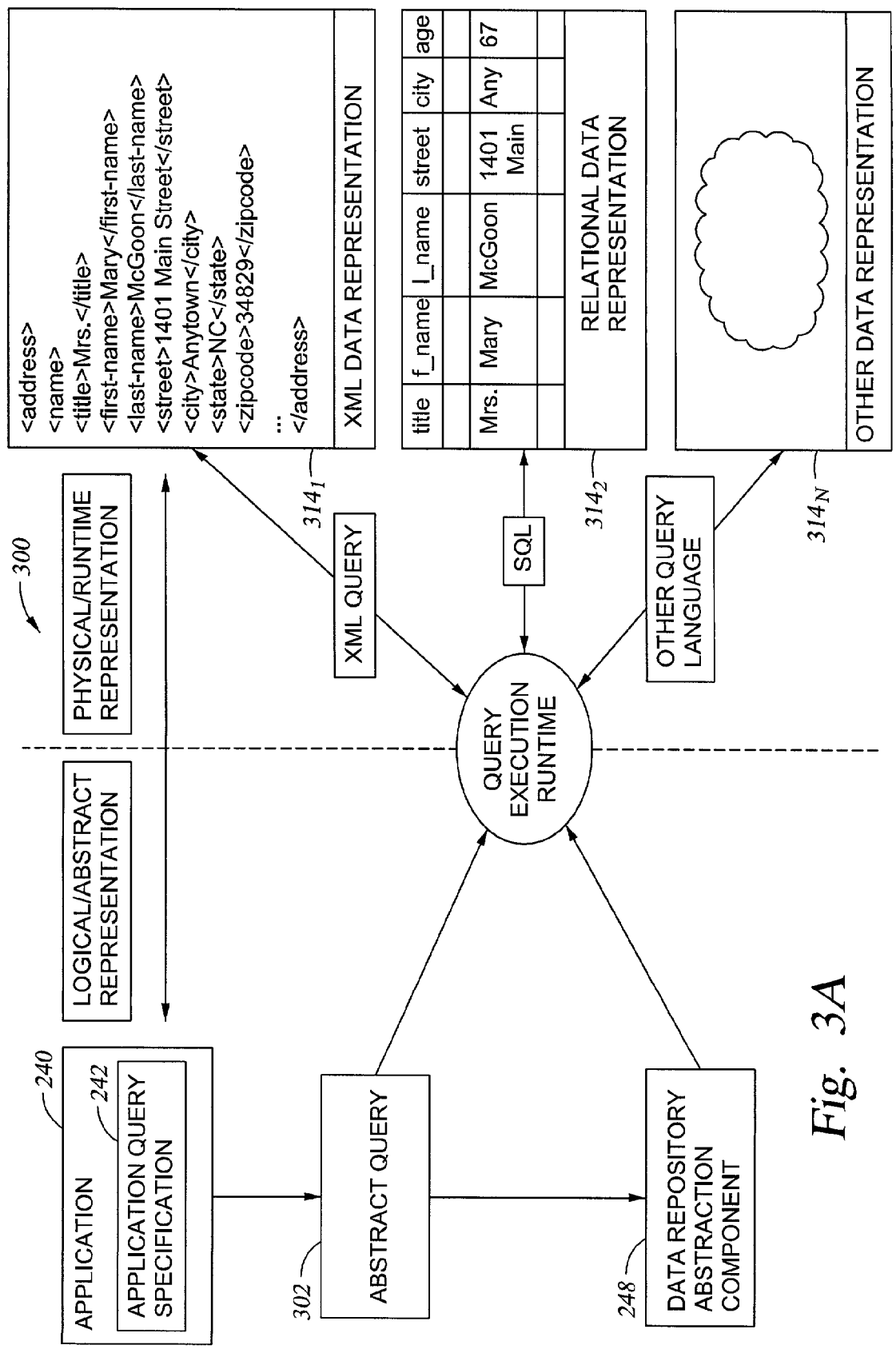
FIG. 3 is a relational view of software components of one embodiment of the invention.
Figure 3B:
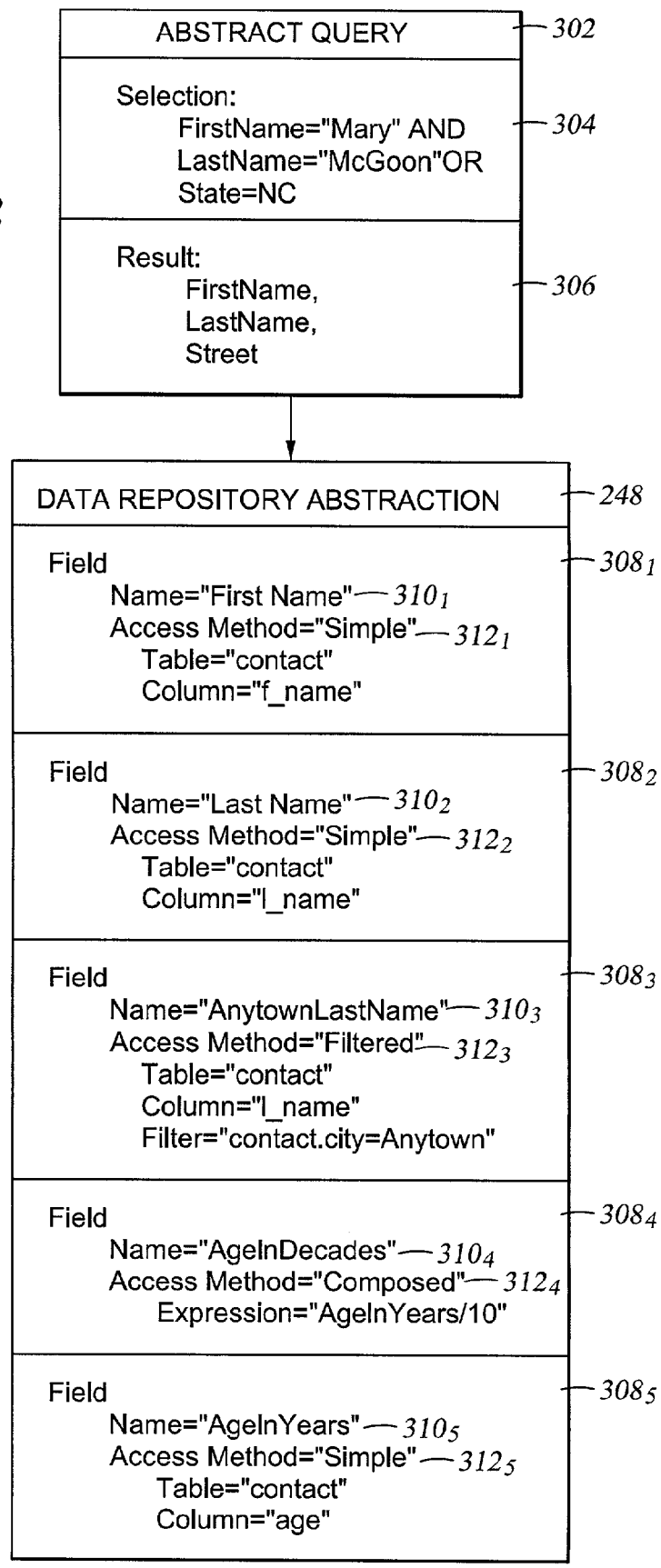

FIGS. 3A–B (collectively FIG. 3) show an illustrative relational view 300 of components of the invention. The requesting entity (e.g., one of the applications 240) issues a query 302 as defined by the respective application query specification 242 of the requesting entity. The resulting query 302 is generally referred to herein as an "abstract query" because the query is composed according to abstract (i.e., logical) fields rather than by direct reference to the underlying physical data entities in the database 254. As a result, abstract queries may be defined that are independent of the particular underlying data representation used. In one embodiment, the application query specification 242 may include both criteria used for data selection (selection criteria 304) and an explicit specification of the fields to be returned (return data specification 306) based on the selection criteria 304.

The logical fields specified by the application query specification 242 and used to compose the abstract query 302 are defined by the data repository abstraction component 248. In general, the data repository abstraction component 248 exposes information as a set of logical fields that may be used within a query (e.g., the abstract query 302) issued by the application 240 to specify criteria for data selection and specify the form of result data returned from a query operation. The logical fields are defined independently of the underlying data representation being used in the database 254, thereby allowing queries to be formed that are loosely coupled to the underlying data representation.

In general, the data repository abstraction component 248 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification comprises a logical field name $310_1$, $310_2$, $310_3$, $310_4$, $310_5$ (collectively, field name 310) and an associated access method $312_1$, $312_2$, $312_3$, $312_4$, $312_5$ (collectively, access method 312). The access methods associate (i.e., map) the logical field names to a particular physical data representation $314_1$, $314_2$ ... $314_N$ in a database (e.g., database 254). By way of illustration, two data representations are shown, an XML data representation $314_1$ and a relational data representation $314_2$. However, the physical data representation $314_N$ indicates that any other data representation, known or unknown, is contemplated. In one embodiment, a single data repository abstraction component 248 contains field specifications (with associated access methods) for two or more physical data representations 314. In an alternative embodiment, a different single data repository abstraction component 248 is provided for each separate physical data representation 314.

Any number of access methods are contemplated depending upon the number of different types of logical fields to be supported. In one embodiment, access methods for simple fields, filtered fields and composed fields are provided. The field specifications $308_1$, $308_2$ and $308_5$ exemplify simple field access methods $312_1$, 2242, and $312_5$, respectively. Simple fields are mapped directly to a particular entity in the underlying physical data representation (e.g., a field mapped to a given database table and column). By way of illustration, the simple field access method $312_1$, shown in FIG. 3B maps the logical field name $310_1$ ("FirstName") to a column named "f_name" in a table named "contact". The field specification $308_3$ exemplifies a filtered field access method $312_3$. Filtered fields identify an associated physical entity and provide rules used to define a particular subset of items within the physical data representation. An example is provided in FIG. 3B in which the filtered field access method $312_3$ maps the logical field name $310_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $308_4$ exemplifies a composed field access method $312_4$. Composed access methods compute a logical field from one or more physical fields using an expression supplied as part of the access method definition. In this way, information which does not exist in the underlying data representation may computed. In the example illustrated in FIG. 3B the composed field access method $312_3$ maps the logical field name $310_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 308 of the data repository abstraction component 248 shown in FIG. 3 are representative of logical fields mapped to data represented in the relational data representation $314_2$. However, other instances of the data repository extraction component 248 map logical fields to other physical data representations, such as XML.

An illustrative abstract query corresponding to the abstract query 302 shown in FIG. 3 is shown in Table I below. By way of illustration, the Data Repository Abstraction 248 is defined using XML. However, any other language may be used to advantage.

TABLE I

QUERY EXAMPLE

```
001  <?xml version="1.0"?>
002  <!--Query string representation: (FirstName = "Mary" AND LastName =
003  "McGoon") OR State = "NC"-->
004  <QueryAbstraction>
005     <Selection>
006        <Condition internalID="4">
007           <Condition field="FirstName" operator="EQ" value="Mary"
008  internalID="1"/>
009           <Condition field="LastName" operator="EQ" value="MoGoon"
010  internalID="3" relOperator="AND"></Condition>
011        </Condition>
012        <Condition field="State" operator="EQ" value="NC" internalID="2"
013  relOperator="OR"></Condition>
014     </Selection>
015     <Results>
016           <Field name="FirstName"/>
017           <Field name="LastName"/>
018           <Field name="State"/>
019     </Results>
020  </QueryAbstraction>
```

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative abstract query corresponding to the Data Repository Abstraction 248 shown in FIG. 3 is shown in Table II below. By way of illustration, the Repository Abstraction 248 is defined using XML. However, any other language may be used to advantage.

TABLE II

DATA REPOSITORY ABSTRACTION EXAMPLE

```
001  <?xml version="1.0"?>
002  <DataRepository>
003     <Category name="Demographic">
004        <Field queryable="Yes" name="FirstName" displayable="Yes">
005           <AccessMethod>
006              <Simple columnName="f_name" tableName="contact"></Simple>
007           </AccessMethod>
008           <Type baseType="char"></Type>
009        </Field>
010        <Field queryable="Yes" name="LastName" displayable="Yes">
011           <AccessMethod>
012              <Simple columnName="l_name" tableName="contact"></Simple>
013           </AccessMethod>
014           <Type baseType="char"></Type>
015        </Field>
016        <Field queryable="Yes" name="State" displayable="Yes">
017           <AccessMethod>
018              <Simple columnName="state" tableName="contact"></Simple>
019           </AccessMethod>
020           <Type baseType="char"></Type>
021        </Field>
022     </Category>
023  </DataRepository>
```

Runtime

Figure 4:
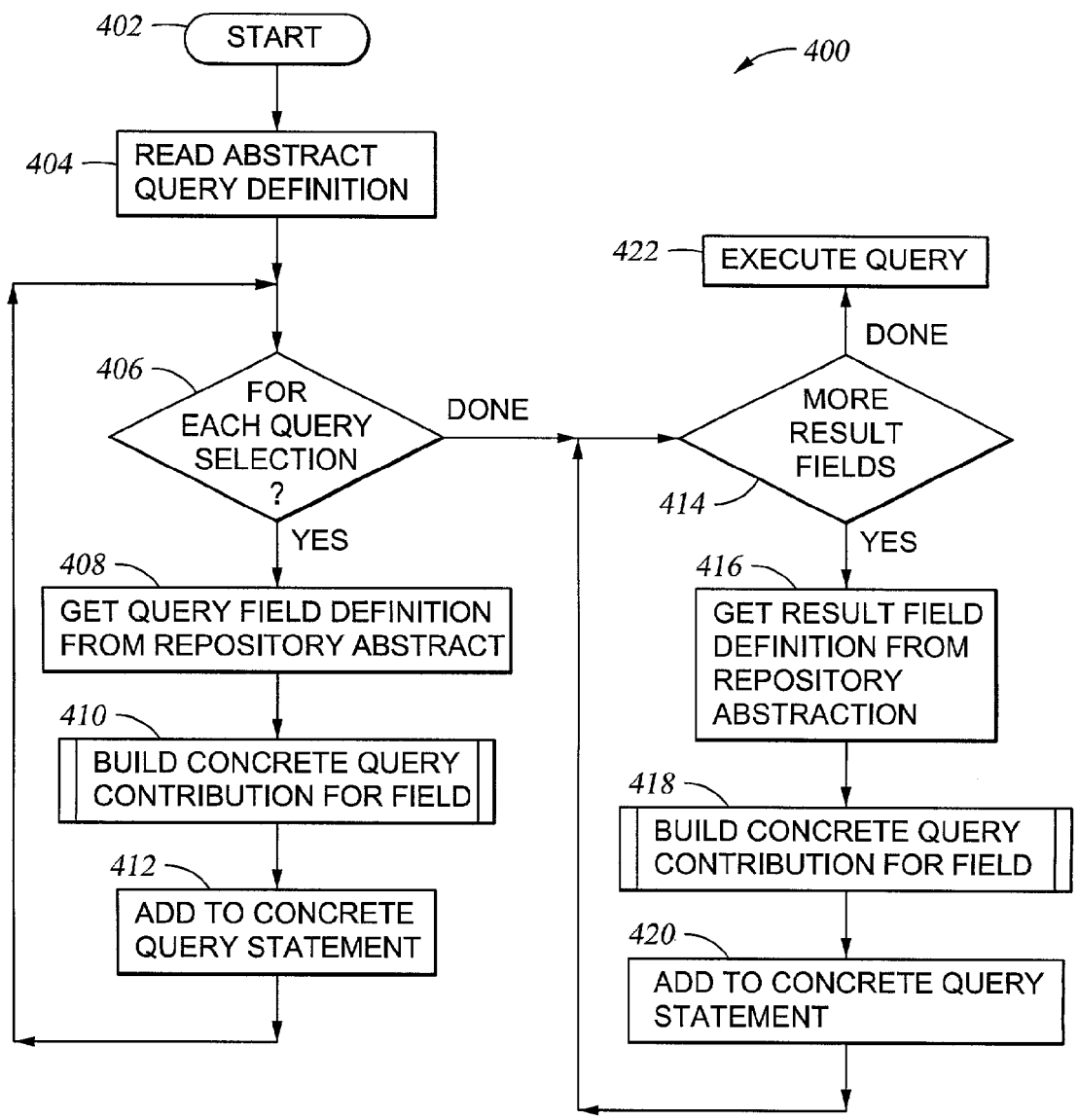
FIG. 4 is a flow chart illustrating the operation of a runtime component.

FIG. 4 shows an illustrative runtime method 400 exemplifying one embodiment of the operation of the runtime component 250. The method 400 is entered at step 402 when the runtime component 250 receives as input an instance of an abstract query (such as the abstract query 302 shown in FIG. 3). At step 404, the runtime component 250 reads and parses the instance of the abstract query and locates individual selection criteria and desired result fields. At step 406, the runtime component 250 enters a loop (comprising steps 406, 408, 410 and 412) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 408, the runtime component 250 uses the field name from a selection criterion of the abstract query to look up the definition of the field in the data repository abstraction 248. As noted above, the field definition includes a definition of the access method used to access the physical data associated with the field. The runtime component 250 then builds (step 410) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 254 shown in FIG. 1. The Concrete Query Contribution generated for the current field is then added to a Concrete Query Statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 250 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 250 looks up a result field name (from the result specification of the abstract query) in the data repository abstraction 248 and then retrieves a Result Field Definition from the data repository abstraction 248 to identify the physical location of data to be returned for the current logical result field. The runtime component 250 then builds (as step 418) a Concrete Query Contribution (of the concrete query that identifies physical location of data to be returned) for the logical result field. At step 420, Concrete Query Contribution is then added to the Concrete Query Statement. Once each of the result specifications in the abstract query has been processed, the query is executed at step 422.

Figure 5:
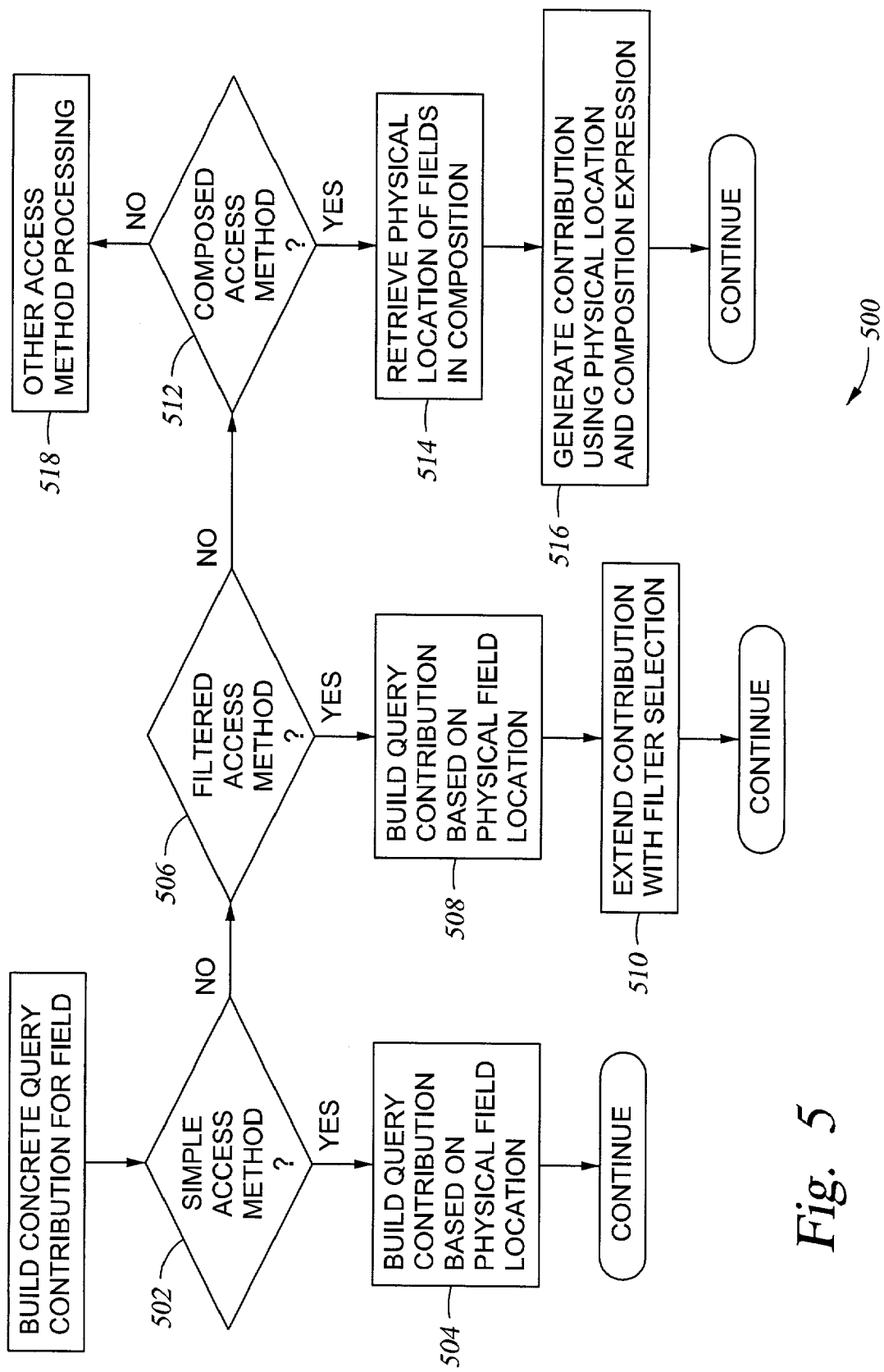
FIG. 5 is a flow chart illustrating the operation of a runtime component.

One embodiment of a method 500 for building a Concrete Query Contribution for a logical field according to steps 410 and 418 is described with reference to FIG. 5. At step 502, the method 500 queries whether the access method associated with the current logical field is a simple access method. If so, the Concrete Query Contribution is built (step 504) based on physical data location information and processing then continues according to method 400 described above. Otherwise, processing continues to step 506 to query whether the access method associated with the current logical field is a filtered access method. If so, the Concrete Query Contribution is built (step 508) based on physical data location information for some physical data entity. At step 510, the Concrete Query Contribution is extended with additional logic (filter selection) used to subset data associated with the physical data entity. Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the Concrete Query Contribution is generated. Processing then continues according to method 400 described above.

If the access method is not a composed access method, processing proceeds from step 512 to step 518. Step 518 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 500. For example, the conversion may be performed as part of, or immediately following, the steps 504, 508 and 516. A subsequent conversion from the format of the physical data to the format of the logical field is performed after the query is executed at step 422. Of course, if the format of the logical field definition is the same as the underlying physical data, no conversion is necessary.

The forgoing aspects provide numerous advantages. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

Graphical User Interfaces

As noted above, one embodiment provides the user with a GUI through which queries may be composed and executed. The GUI screens (built with GUI content from the application 240) generally provide search criteria categories and associated values from which a user may select. The selections of the user are used to build the application query specification 242. The query may then be executed in the manner described above.

For purposes of the present description it will be helpful to define some terms. As is evident from the above description, to perform a search for a set of desired database records within the repository 254, a requesting entity (e.g., application 240) builds a query by combining one or more "operands" and "logic operators" to form a search expression. The operands and operators together identify the desired search. Each operand may be a comparison operation (defined by a comparison operator, e.g., >, <, =) which defines a value for a parameter of an element in the repository 254. For instance, an operand may be "(DateOfBirth='1942/01/01')" which represents a request for search results having a "DateOfBirth" parameter equal to a date value of 1942/01/01. Another illustrative operand is "(DateOfBirth>'1942/01/01')" which represents a request for search results having a "DateOfBirth" parameter greater than 1942/01/01. Two or more operands can be related by a logic operator representing a logical relationship between operands. Logic operators are logical connectors, such as logical AND, OR, and NOT. Each operand, or operand with a logic operator, defines a single search criterion.

For purposes of the present description, a singular operand is referred to herein as a "simple condition" or just "condition". Two or more operands/conditions related by a logic operator form a "complex condition" or "compound condition". A simple condition or complex condition may make up a portion of a search expression (i.e., a query) which is executed by the application 240.

Referring now to FIGS. 6–11, a series of graphical user interfaces are shown illustrating the user interfaces defined by the application 240. By way of illustration, the graphical user interfaces shown in FIGS. 6–11 are specific to accessing medical data. However, embodiments of the invention may be used to advantage with any type of information including, for example, financial information, employment information, etc. In general, the graphical user interfaces shown in FIGS. 6–11 allow a user to build queries comprising conditions added by the user. Recall that, as defined herein, a simple condition is a comparison operation. An illustrative simple condition is (DateOfBirth='1942/01/01'). Thus, adding a simple condition to a query generally involves allowing the user to select operands and a comparison operator (e.g., >, <, =). In one embodiment, when a user initially invokes the application 240 via the browser program 222, the application 240 returns HTML content which is rendered by the browser program 222 in the form of a first GUI 600, shown in FIG. 6. The GUI 600 is the first of a series of screens which a user uses to add a condition to a query. In general, the GUI 600 includes a plurality of condition categories 602–610 (each having an associated radio button) from which a user may select. The condition categories shown include "demographics" 602, "tests and laboratory results" 604, "reports" 606, "diagnostic using ICD-9" 608, and "diagnostic using DRG" 610. Each of the condition categories has an associated field 612–620 from/into which a value may be selected/input. Some fields (e.g., fields 612–616) are drop-down menus, while others are text boxes (e.g., fields 618–620) for receiving user input. In the latter case, the fields may have associated Browse buttons 622–624 to facilitate user selection of valid values.

Once a condition category and value have been selected, the user clicks on the Next button 626. Clicking the Next button 626 causes the browser program 622 to render (according to information provided by the application 640) the next appropriate graphical user interface necessary to continue the process of adding a condition. In this manner, the user may be presented with a series of graphical user interfaces necessary to add a condition. By way of example, assume that the user has selected the demographic condition category 602 and the "date of birth" value from the drop-down menu 612. Upon pressing the Next button 626, the user is presented with a second GUI 700 shown in FIG. 7. The GUI 700 comprises a comparison operator drop-down menu 702 from which a user may select a comparison operator (e.g., >, <, =) and a date field 704 into which a user may input a date according to a prescribed format (e.g., "yyyy/mm/dd"). The process of adding the date of birth condition is completed when the user clicks on the OK button 706.

Figure 8:
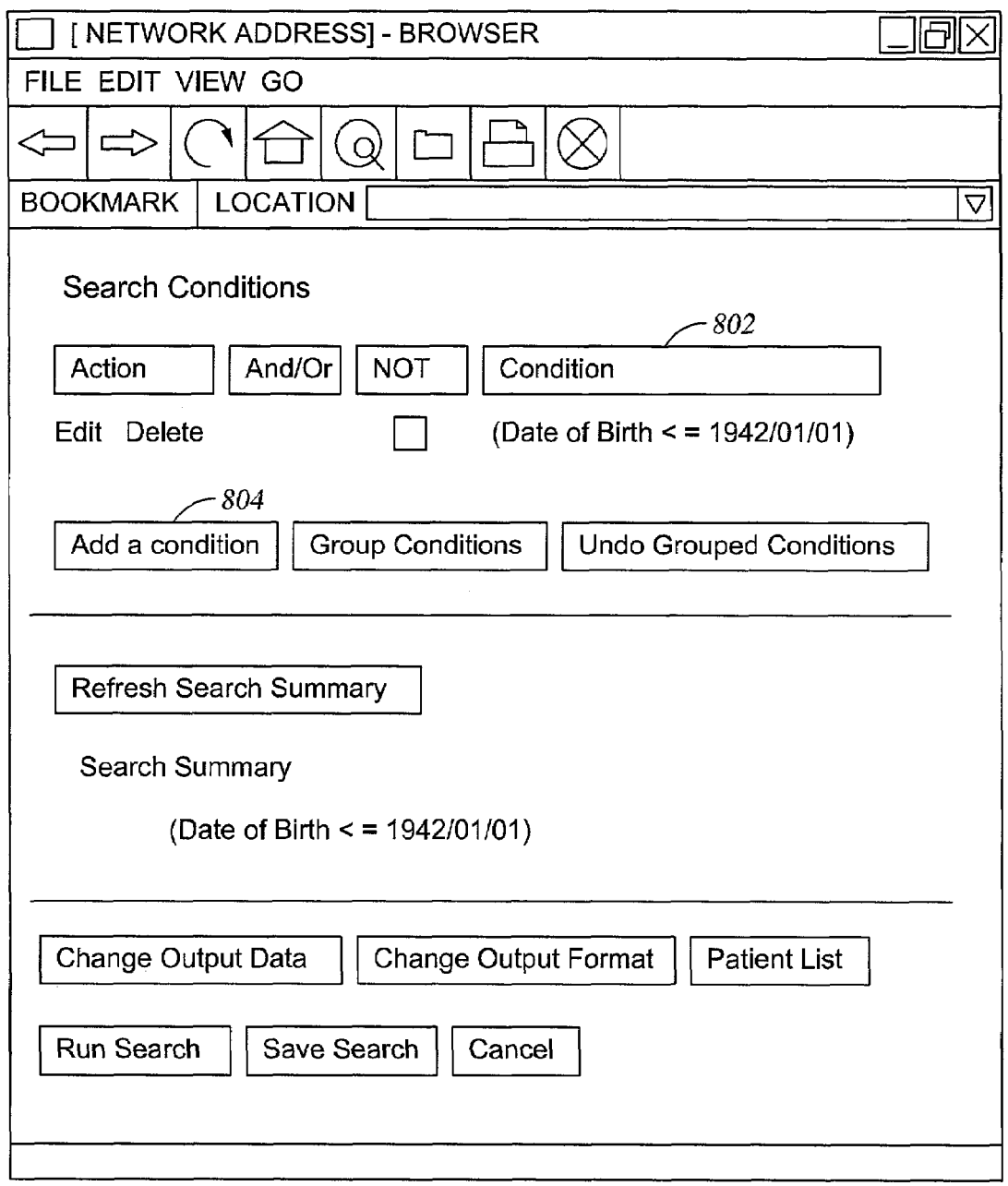
FIG. 8 is a graphical user interface screen displaying existing conditions to a query and from which a user may add additional conditions to the query and execute the query.
Figure 9:
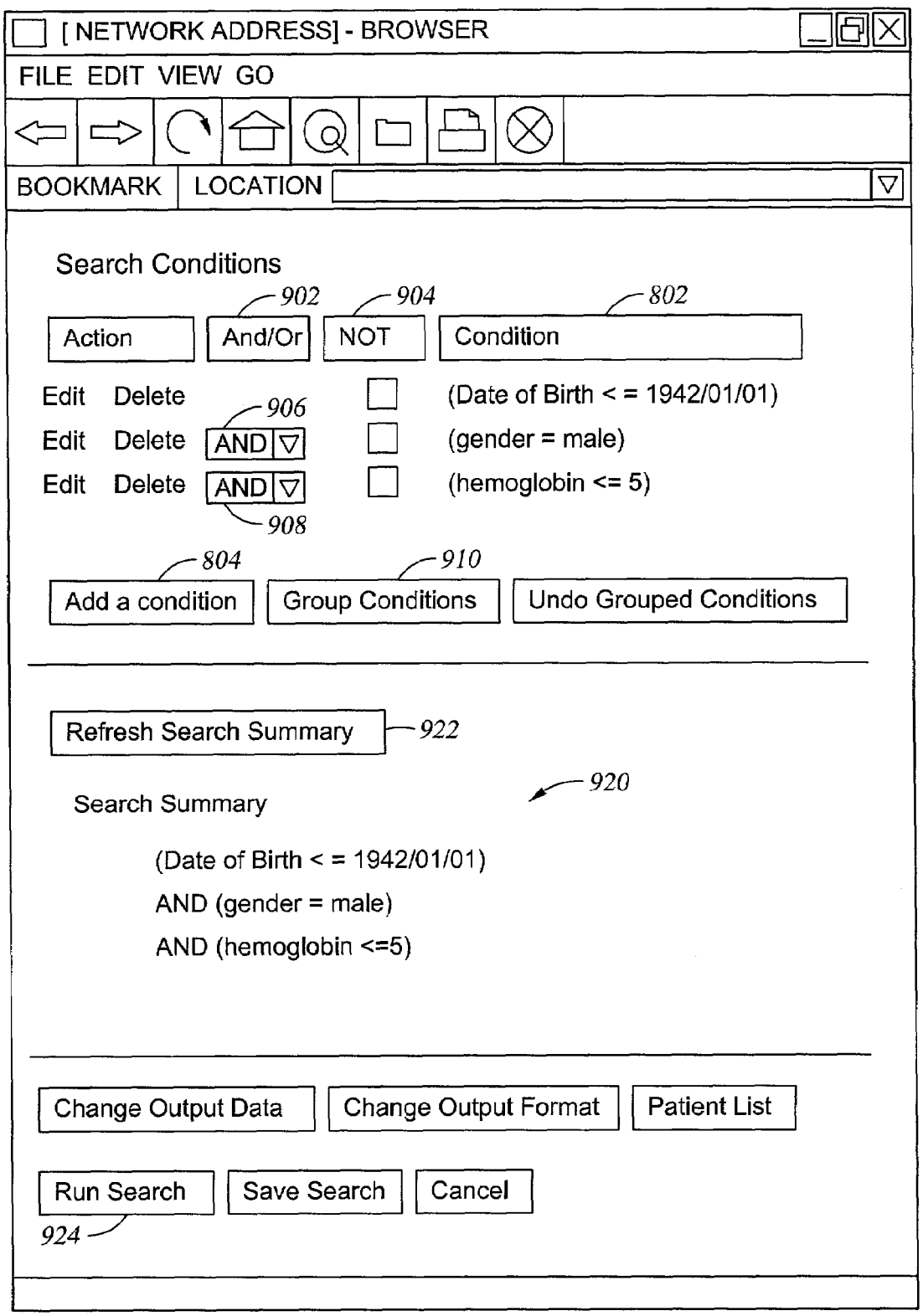
FIG. 9 is the graphical user interface screen of FIG. 4 after being updated with additional conditions.

When the user has completed the process of adding a condition (e.g., such as after clicking the OK button 706), the user is presented with the GUI 800 shown in FIG. 8. The resulting conditions are shown in a condition column 802. In the present example, a first row of the condition column 802 shows the date of birth condition added using the GUIs 600 and 700 described above. The user may add another condition by clicking the "Add a Condition" button 804. By repeating similar steps for each of the other available condition categories and values, any number of conditions may be added to a query. By way of illustration, the refreshed/updated GUI 800 shown in FIG. 9 shows a total of three conditions (including the date of birth condition described above), each of which were added by stepping through the graphical user interfaces for adding a condition (e.g., the GUIs 600 and 700). Further, although not shown, adding a condition may require any number of other graphical user interfaces. In particular, a plurality of additional graphical user interfaces may be required for more complicated conditions, such as ranges. The particular number, content, design and elements of such graphical user interfaces may be determined by persons skilled in the art according to aspects of the invention.

After the first condition has been added, each of the subsequent conditions are related to one another to the first condition by a Boolean logic value/operator, referred to herein as a first level Boolean logic value. Referring to FIG. 9, the first level Boolean logic values are shown in a pair of columns 902, 904. The first level Boolean logic values AND and OR are selected from drop-down menus 906, 908 in the first column 902. An AND/OR drop-down menu is located between each condition. Accordingly, in the illustration shown in FIG. 9, a first drop-down menu 906 is located between the "date of birth" condition and the "gender" condition and a second drop-down menu 908 is located between the "gender" condition and a "hemoglobin" condition. In one embodiment, the first level Boolean logic value defaults to AND for each condition added after the first condition. A user may then change the default value to OR using the drop-down menu. Alternatively, the user may negate the condition by checking the appropriate NOT checkbox in the second column 904.

Once two or more conditions have been added to a query, two or more conditions may then be grouped together by Boolean logic values, referred to herein as second level Boolean logic values, to produce complex (or grouped) conditions. An example of a complex condition is ((employeeName='Rich') OR (employeeName='John')). Further, simple conditions and complex conditions may be connected by Boolean logic values to produce a hierarchy of conditions. In one embodiment, the first graphical element used to group conditions together is a "Group Conditions" button 910.

Figure 10:
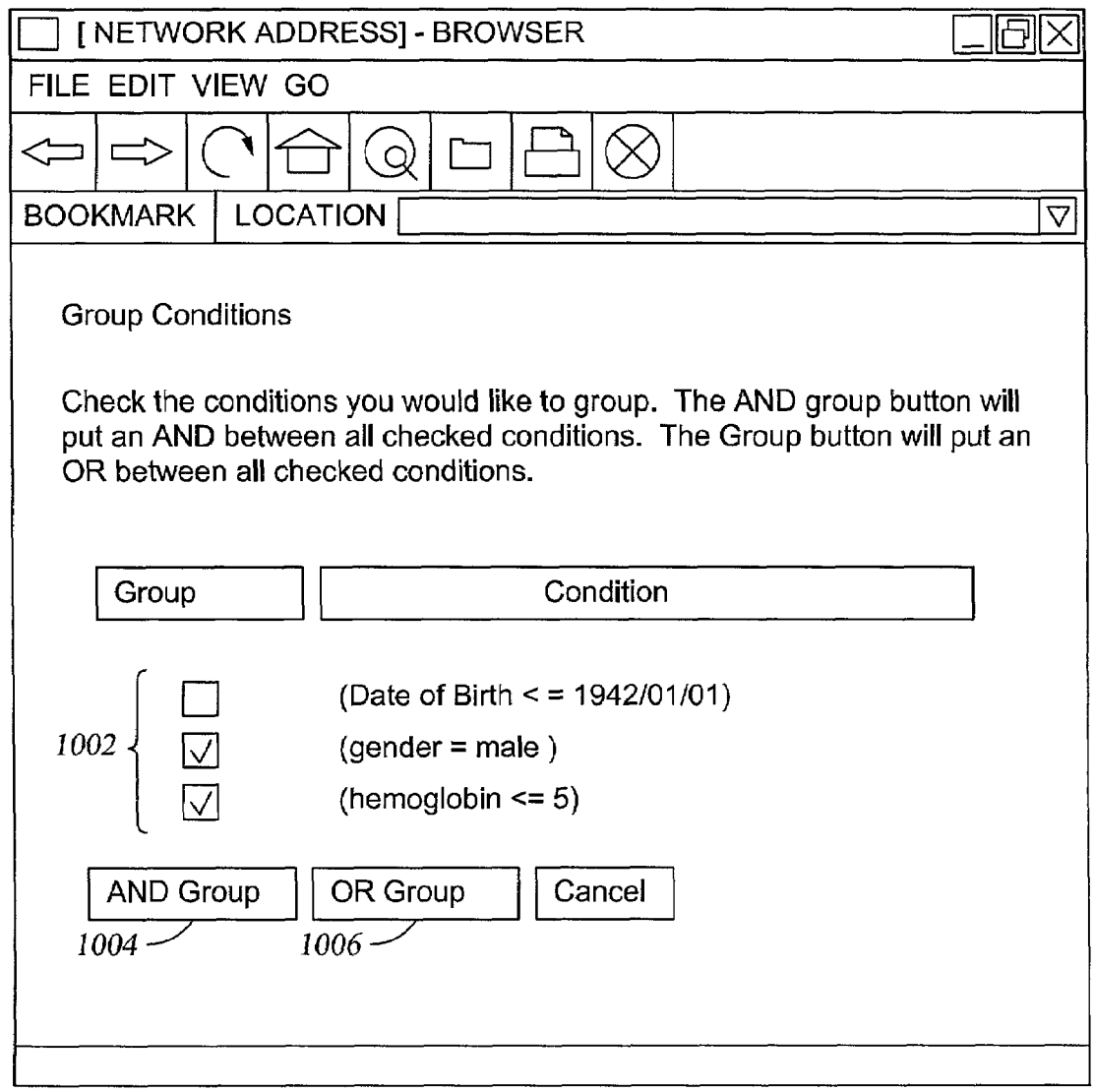
FIG. 10 is a graphical user interface screen from which a user may group conditions to form a complex condition.

In one embodiment, pressing the "Group Conditions" button 910 causes the application 240 to generate the GUI 1000 shown in FIG. 10. The GUI 1000 displays each of the available conditions and an associated checkbox 1002 for each condition. The user selects which conditions are to be grouped together by checking the appropriate checkbox 1002. Illustratively, the "gender" and the "hemoglobin" conditions are selected. The GUI 1000 further provides and "AND Group" button 1004 and an "OR Group" button 1006, for ANDing or ORing the selected groups. Assume, by way of illustration, that a user clicks the "AND Group" button 1004. The result of this action is shown by the updated GUI 800 in FIG. 11. Specifically, only two conditions 1102, 1104 remain, with the second condition 1104 being a complex condition comprising to sub conditions related by a Boolean AND. Further, the two conditions 1102, 704 are themselves related by a Boolean AND, shown in the drop-down menu 906.

Figure 12:
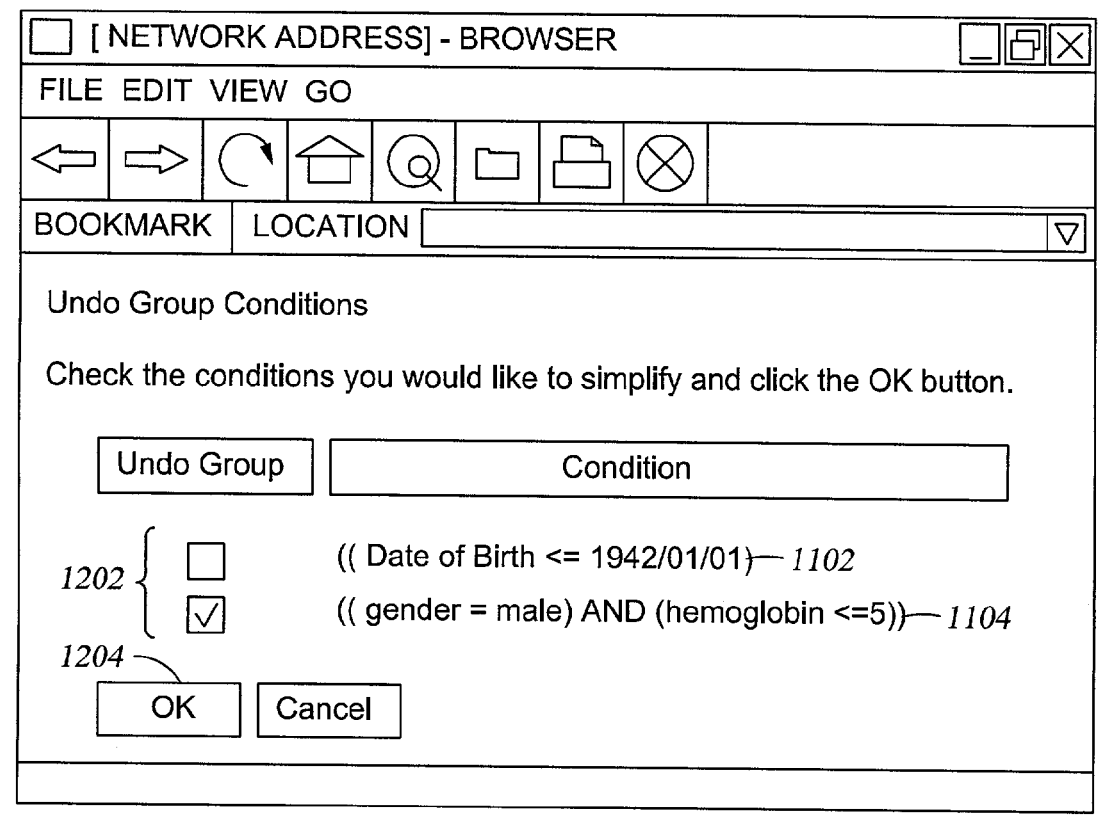
FIG. 12 is a graphical user interface screen from which a user may ungroup conditions of a complex condition.

Assume now that a user desires to ungroup the second condition 1104. To facilitate this task, the GUI 900 (shown in FIG. 11) includes an "Undo Grouped Conditions" button 1106. Pressing the "Undo Grouped Conditions" button 1106 causes the application 240 to generate the GUI 1200 shown in FIG. 12. The GUI 1200 displays each of the existing conditions and an associated checkbox 1202. In alternative embodiment, only the complex conditions (such as the second condition 1104 in this case) are shown in the GUI 1200. In any event, to ungroup a complex condition, the user checks the appropriate checkbox 1202 and then clicks the OK button 1204. In this case, the result of ungrouping the second condition 1104 is shown by the GUI 900 and FIG. 9. That is, the conditions are returned to their original ungrouped states.

Figure 11:
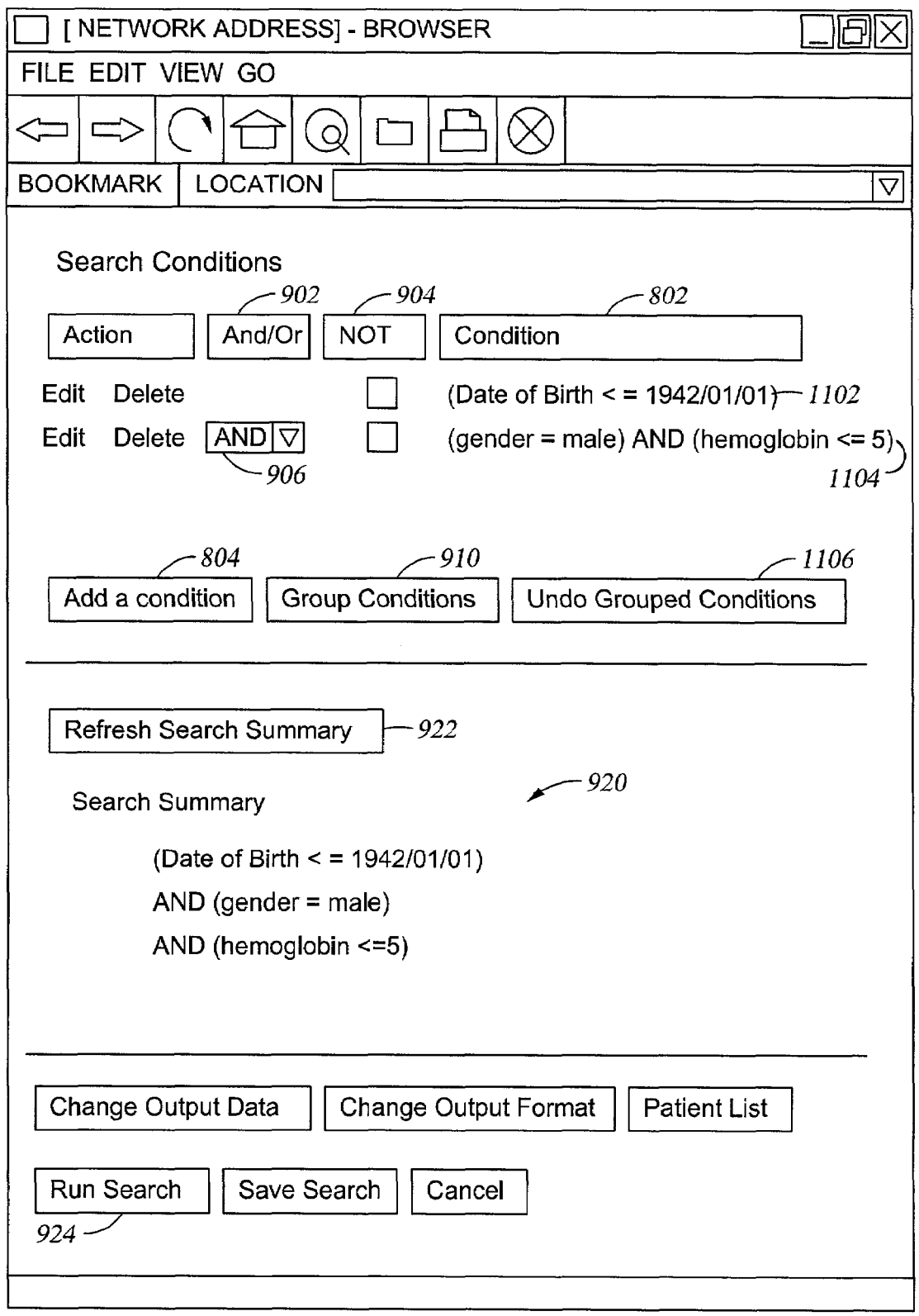
FIG. 11 is the graphical user interface screen of FIG. 4 after having been updated to reflect grouped conditions.
Figure 14:
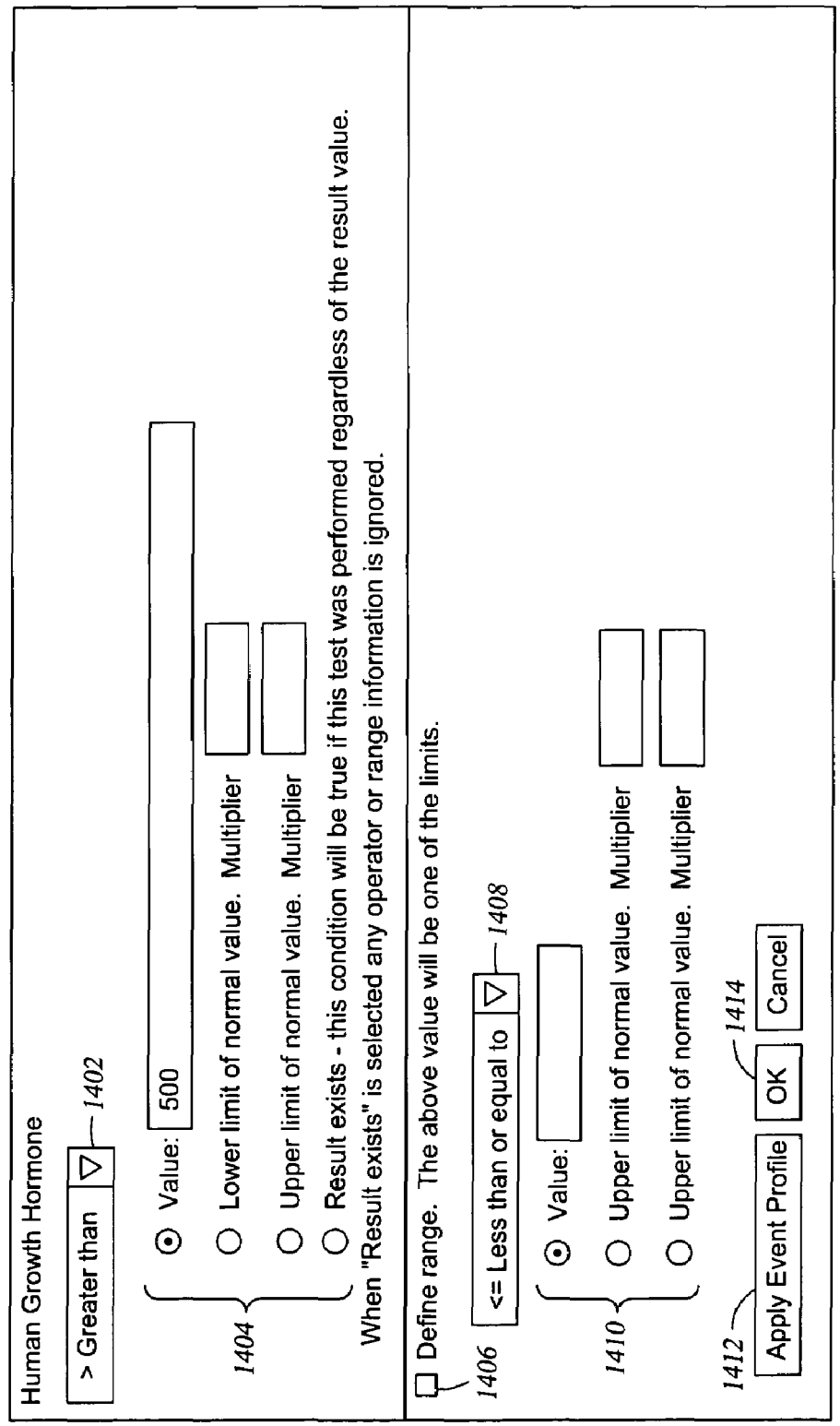
FIG. 14 is a graphical user interface screen from which a user may specify a desired values for a human growth hormone test.
Figure 16:
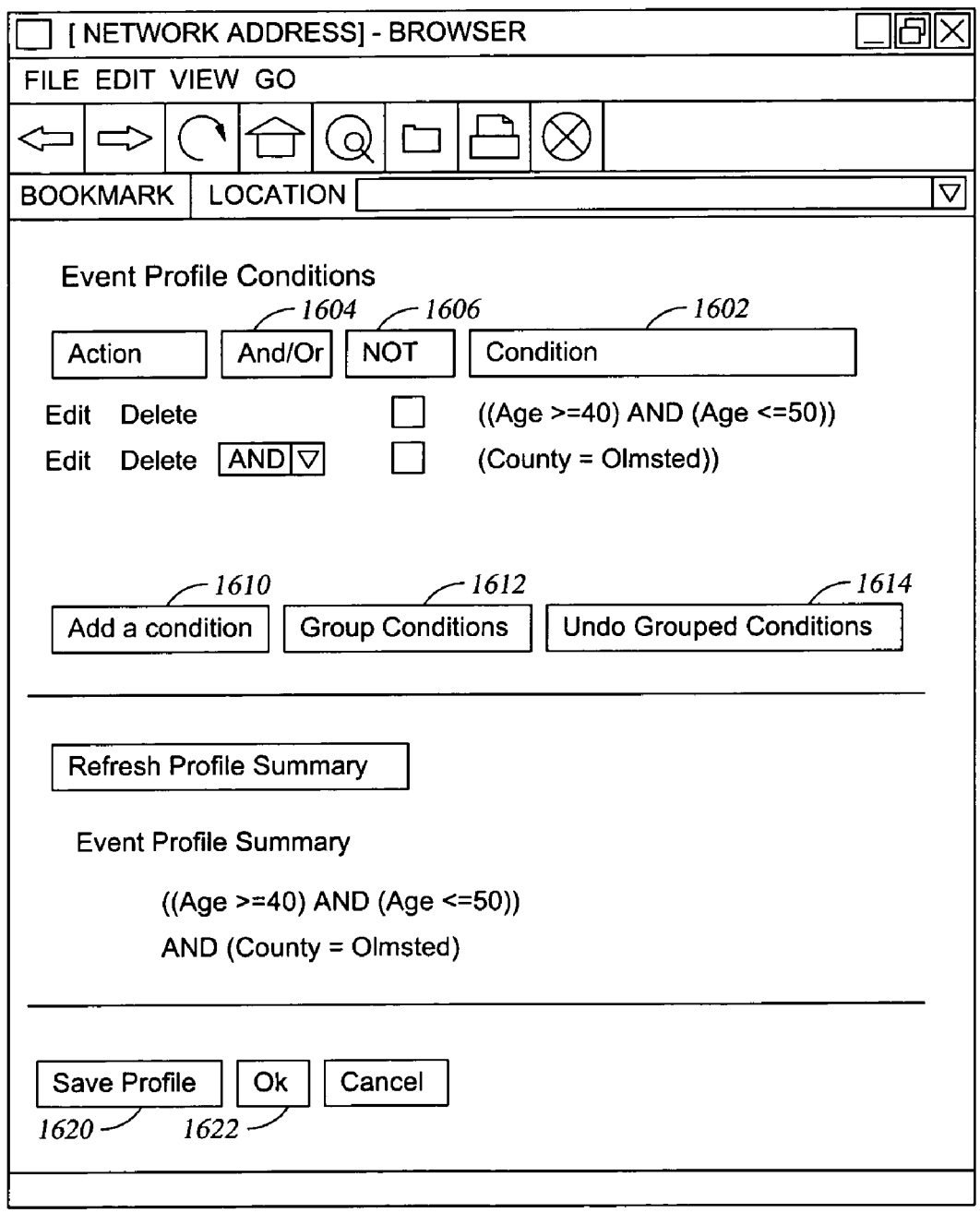
FIG. 16 is a graphical user interface screen which displays the collective conditions defining an event profile and provides selectable graphical elements to add event profile conditions, group event profile conditions and ungroup event profile conditions.

The current structure of a given query may be viewed by a user in a search summary section 920 of the GUI 900 shown in FIG. 9 and FIG. 11. In one embodiment, the query displayed in a search summary section 920 is updated by clicking a "Refresh Search Summary" button 922. Once the desired query has been built, the user may execute the query by pressing the "Run Search" button 924. In particular, pressing the "Run Search" button 924 invokes a function of the application 240 which performs the execution.

In one embodiment of the present invention, a condition (simple or complex) is qualified with one or more of the event profiles 244. In one embodiment, an event profile is a persistent entity which may include one or more conditions and one or more logical connectors. Binding the event profile to another condition characterizes that portion of the query as event-based. As defined above, event-based queries are queries or searches that associate a search criterion/criteria (i.e., a condition) with an event defined by another search criterion/criteria (i.e., a condition). As defined herein, an event profile is an entity which is bound to a condition such that only those results are returned for which the condition and the event profile are contemporaneously (i.e., with respect to one another) satisfied. Stated differently, the event profile is only applied when the condition (also referred to the "event" in this context) occurred. Logically, the event profile may be viewed as connected to the condition/event by a WHEN clause. For example, the event-based search expression from above may be re-written as: "Find all customers who lived in Minnesota WHEN they were between the ages of 30 and 40 years". In this example, the "event" is living in Minnesota. Thus, the condition "between the ages of 30 and 40 years" is only applied for the time during which customers lived in Minnesota.

It should be noted that the event qualified by an event profile need not correspond directly to time. Specifically, an event may also be defined by a range of some parameter. For example, the following mathematical event may be specified: $10<X<100$. An event profile may then be bound (i.e., applied) to the mathematical event such that only those results are returned which satisfy the event profile while the mathematical event is satisfied.

Figure 6:
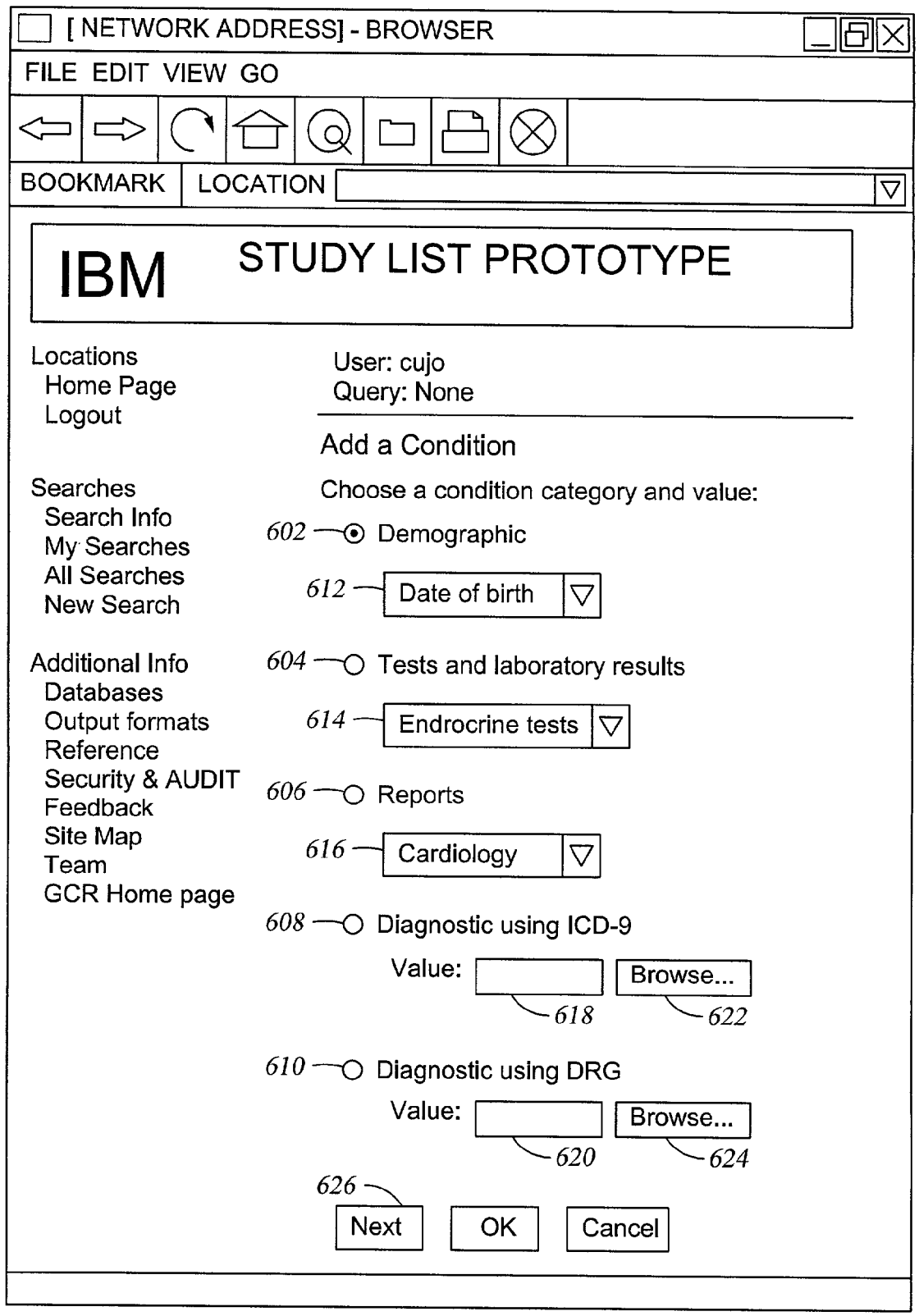
FIG. 6 is a graphical user interface screen for initiating the process of adding a condition to a query.
Figure 7:
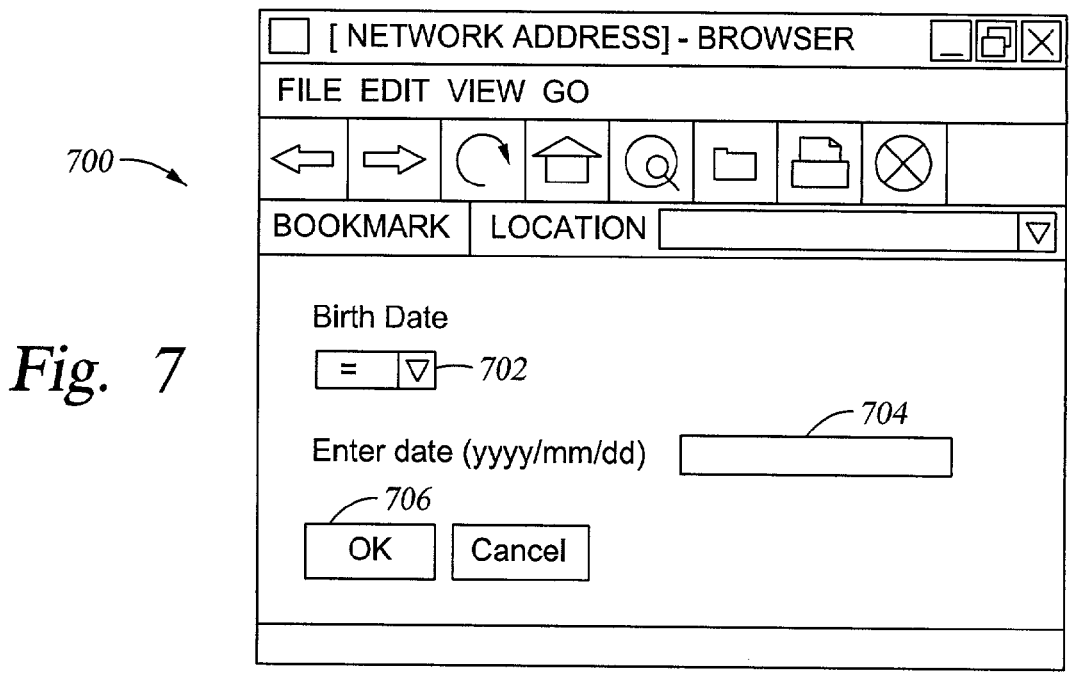
FIG. 7 is a graphical user interface screen for adding a birth date as a condition to a query.

Illustrative, steps by which an event profile may be created and applied will now be described with reference to FIGS. 6 and 13–19. Referring first to FIG. 6, assume that a user selects the "tests and laboratory results" condition category 604 with the selected test from the drop-down menu 214 being "Endocrine tests". By pressing the NEXT button 226, the user will be presented with the GUI screen 1300 shown in FIG. 13 from which the user may select a particular endocrine test. If available list is lengthy, then the screen is scrollable. After selecting the desired test (illustratively "Human growth hormone") the user presses the NEXT button 1302 to proceed to the next screen 1400 (FIG. 14) in which the user defines the desired search criteria for the selected test. The upper portion of the screen 1400 includes a drop-down menu 1402 from which to select a comparison operator and a plurality of radio buttons (illustratively for) for defining a value. The user may search on a range of values for the selected test by checking the Range checkbox 1406. The user must then specifying a comparison operator from the drop-down menu 1408 and an associated value by selecting one of the radio button is 1410.

Once the search criteria in the screen 1400 have been selected, the user may press the OK button 1414 to proceed to a GUI screen such as the screen 800 shown in FIG. 8 where the collective components of the query are displayed. Alternatively, the user may press the Apply Event Profile button 1412 to initiate a process of binding one of the event profiles 244 to the newly created condition.

Assuming that the user presses the Apply Event Profile button 1412 and further assuming that no event profile has yet been defined, the user will be provided with the to the screen 1500 shown in FIG. 15. The screen 1500 generally comprises a plurality of radio buttons 1505, 1510, 1515, 1520, 1525 and 1530 each associated with a condition category. By selecting the desired radio button and pressing the OK button 1535, the user is presented with a GUI screen 1600 (FIG. 16) which displays the defined conditions for an event profile in a condition column 1602. For example, assume that the user selects the age range radio button 1505 and specifies a lower limit range of 40 (in a lower limit field 1506) and an upper limit range of 50 (in the upper limit field 1508). The resulting condition is shown in the first row of the condition column 1602 in the screen 1600. The user may then add another condition by pressing the Add a Condition button 1610, which returns the user to the screen 1500. Assume that as a second condition, the user selects the geographic location radio button 1515 and specifies "Olmsted" in the county field 1517. The resulting condition is shown in the second row of the condition column 1602. The user may repeat the foregoing steps to add any number of conditions to the event profile. Note that the GUI screen 1600 also includes Group Conditions button 1612 and Undo Grouped Conditions button 1614 which allow the user to group and undo grouped conditions in the manner described above.

Once the user has defined the desired event profile, the user may press the Save Profile button 1620 in order to create a persistent entity for future use. Upon pressing the Save Profile button 1620, the user is presented with the GUI screen 1700 in FIG. 17. The GUI screen 1700 comprises a name field 1705 and a description field 1710 whereby the user may specify a name and a brief description, respectively, for the newly created event profile. Pressing the OK button 1715 returns the user to the GUI screen 1600. The user may then press the OK button 1622 and proceed to the GUI screen 1800 (FIG. 18) where the existing event profiles are displayed according to their names specified in the name field 1705 of the screen 1700 shown in FIG. 17. The GUI screen 1800 is also where the user would have been directed after pressing the Apply Event Profile button 1412 in a GUI screen 1400 if at least one event profile had existed when the button 1412 was press. Each of the event profiles shown in the GUI screen 1800 has an associated radio button whereby the event profiles may be selected. Since the present example assumed that no event profiles existed, only the newly created event profile ("Olmsted County") is shown. However, more typically, a number of event profiles will be displayed. In some cases, a user may be uncertain as to the defined conditions for an event profile. In such cases, the user may press a details button 1805 (only one shown) for a particular event profile to view its definition. Pressing the New Profile button 1810 returns the user to the GUI screen 1500 from which the user may repeat the foregoing steps to define an event profile. Pressing the OK button 1815 causes the selected event profile to be applied to the specified condition and presents the user with the updated GUI screen 800 in FIG. 19 in which the collective components of the query are displayed and from which the query may be executed. The newly created condition with the event profile is shown in the first row of the condition column 802.

The user may then add additional conditions, group conditions or undo group conditions in the manner described above. When the user is satisfied with the query, the user may run the query by pressing the Run Search button 924.

Figure 19:
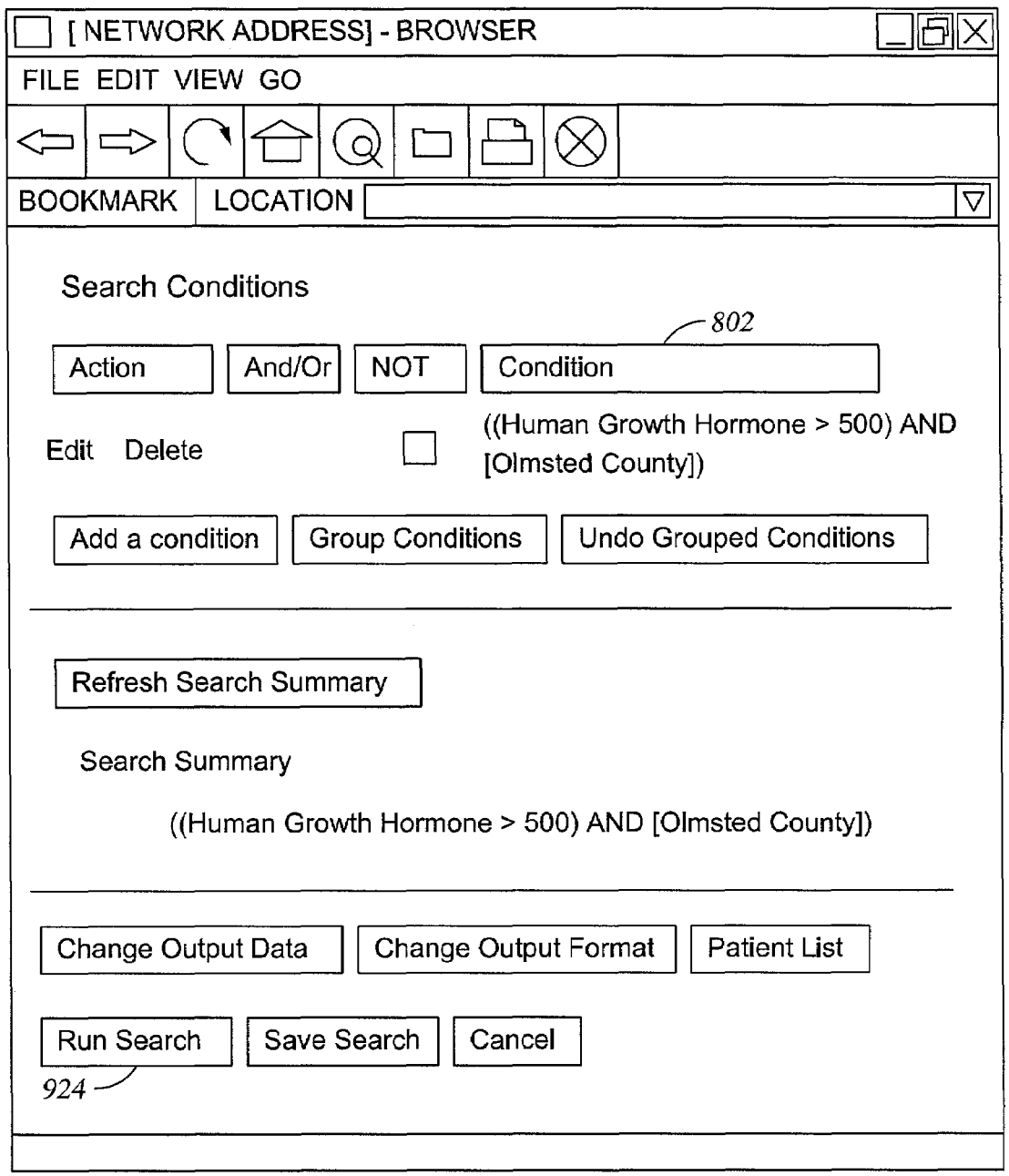
FIG. 19 is a graphical user interface screen which displays the collective conditions defining an event profile and provides selectable graphical elements to add conditions, group conditions, ungroup conditions and execute the query.

The query condition built in the foregoing example (and shown in the first row of the condition column 802 of the screen 800 in FIG. 19) includes a first condition (also referred to in this context as an "event") for a human growth hormone test having a value greater than 500. This first condition is qualified by a second condition defined by an event profile which specifies and age range between 40 and 50 and a county named Olmsted. In the present invention, the event profile is defined such that the condition of the event profile is only applied for the time period when human growth hormone test values were greater than 500.

The foregoing illustrative query composed with an event profile is further described with reference to the following Tables and the Appendix. Table III provides an example of a query abstraction to represent the query to return a firstname and lastname for people with HumanGrowthHormone value greater than 500 and using the event profile called "Olmsted Co". This representation relies on the query execution runtime component 250 to read the contents of the appropriate event profile to find the conditions to append to the query. Line 006 in Table III identifies the event profile by name.

TABLE III

| Query Abstraction |
|---|
| <?xml version="1.0"?> |
| 002      <!--Query string representation: (HumanGrowthHormone> 500 AND [EP-Olmsted Go]) |
| 003      <QueryAbstraction> |
| 004        <Selection> |
| 005          <Condition field="HumanGrowthHormone"operator="GT" value="500" |
| 006      internalID="1" EP="Olmsted Co"></Condition> |
| 007        </Selection> |
| 008        <Results> |
| 009          <Field name="FirstName"/> |
| 010          <Field name="LastName"/> |
| 011        </Results> |
| 012      </QueryAbstraction> |

Table IV shows an alternative implementation in which the conditions from the event profile called "Olmsted Co" are logically ANDed with those of the query conditions. Lines 007–012 are the conditions added from the event profile.

TABLE IV

```
<?xml version="1.0"?>
002     <!--Query string representation: (HumanGrowthHormone > 500 AND [EP-
Olmsted Go])
003     <QueryAbstraction>
004       <Selection>
005         <Condition field="HumanGrowthHormone" operator="GT" value="500"
006   internalID="1"></Condition>
007         <Condition field="AgeAtEvent" operator="GE" value="40"
008   internalID="2" relOperator="AND"></Condition>
009         <Condition field="AgeAtEvent" operator="LE" value="50"
010   internalID="3" relOperator="AND"></Condition>
011         <Condition field="CountyAtEvent" operator="EQ" value="Olmsted"
012   internalID="4" relOperator="AND"></Condition>
013       </Selection>
014       <Results>
015         <Field name="FirstName"/>
016         <Field name="LastName"/>
017       </Results>
018     </QueryAbstraction>
```

A representation of the Data Repository Abstraction used for the queries above is shown in the APPENDIX. The AgeAtEvent (058–063) is a composed access method which determines the age at the time of the event by using the labts field. labts is a timestamp for when the lab was performed that meet the criteria of the condition; namely, when the Human Growth Hormone value was greater than 500. CountyAtEvent (064–069) is a filtered access method which compares move-in and move-out dates of an address history table to the timestamp of the lab event (labts).

Table V illustrates an example of SQL that could be generated to perform the same query.

Table V—SQL Example

Select firstname, lastname from contact c, addrhist a, lab l where c.personid=a.personid and c.personid=l.personid and test='Human Growth Hormone' and labvalue>500 and year (date(labts)-birthdate)>=40 and year(date(labts)-birthdate<=50 and date(labts)>=movein and date(labts)<=moveout and county='Olmsted'

While the foregoing is directed to embodiments of the present invention, other and further embodiments of the invention may be devised without departing from the basic scope thereof, and the scope thereof is determined by the claims that follow.

APPENDIX

```
001  <?xml version="1.0"?>
002  <DataRepository>
003    <Category name="Demographic">
004      <Field queryable="Yes" name="FirstName" displayable="Yes">
005        <AccessMethod>
006          <Simple columnName="f_name" tableName="contact">
007          </Simple>
008        </AccessMethod>
009        <Type baseType="char"></Type>
010      </Field>
011      <Field queryable="Yes" name="LastName" displayable="Yes">
012        <AccessMethod>
013          <Simple columnName="l_name" tableName="contact">
014          </Simple>
015        </AccessMethod>
016        <Type baseType="char"></Type>
017      </Field>
018      <Field queryable="Yes" name="Birthdate" displayable="Yes">
019        <AccessMethod>
020          <Simple columnName="birthdate" tableName="contact">
021          </Simple>
022        </AccessMethod>
023        <Type baseType="date"></Type>
024      </Field>
025      <Field queryable="Yes" name="HumanGrowthHormone" displayable="Yes">
026        <AccessMethod>
027          <Filtered filter="test='HumanGrowthHormone'" table=lab
028                                             column=labvalue</Filtered>
029        </AccessMethod>
030        <Type baseType="integer"></Type>
031      </Field>
032      <Field queryable="Yes" name="Labtimestamp" displayable="Yes">
```

APPENDIX

```
033          <AccessMethod>
034              <Simple columnName="labts" tableName="lab"></Simple>
035          </AccessMethod>
036          <Type baseType="timestamp"></Type>
037      </Field>
038      <Field queryable="Yes" name="State" displayable="Yes">
039          <AccessMethod>
040              <Simple columnName="state" tableName="addrhist"></Simple>
041          </AccessMethod>
042          <Type baseType="char">/Type>
043      </Field>
044      <Field queryable="Yes" name="County" displayable="Yes">
045          <AccessMethod>
046              <Simple columnName="county" tableName="addrhist">
047              </Simple>
048          </AccessMethod>
049          <Type baseType="char"></Type>
050      </Field>
051      <Field queryable="Yes" name="MovedIn" displayable="Yes">
052          <AccessMethod>
053              <Simple columnName="movedin" tableName="addrhist">
054              </Simple>
055          </AccessMethod>
056          <Type baseType="date"></Type>
057      </Field>
058      <Field queryable="Yes" name="MovedOut" displayable="Yes">
059        <AccessMethod>
060            <Simple columnName="movedout" tableName="addrhist">
061            </Simple>
062        </AccessMethod>
063        <Type baseType="date"></Type>
064      </Field>
065      <Field queryable="Yes" name="AgeAtEvent" displayable="Yes">
066          <AccessMethod>
067              <Composed expression="year(date(labts)-birthdate)"></Composed>
068          </AccessMethod>
069          <Type baseType="integer"></Type>
070      </Field>
071      <Field queryable="Yes" name="CountyAtEvent" displayable="Yes">
072          <AccessMethod>
073              <Filtered filter="date(labts) >=movein and date(labts) <=moveout"
                     table=addrhist
074                   column=county</Filtered>
075          </AccessMethod>
076          <Type baseType="char"></Type>
077      </Field>
078    <Relations>
079       <Link source="contact" target="lab">
080         <LinkPoint source="personid" target="personid"/>
081       </Link>
082       </Link source="contact" target="addrhist">
083         <LinkPoint source="personid" target="personid"/>
084       </Link>
085    </Relations>
086   </Category>
087 </DataRepository>
```

What is claimed is:

1. A method of programmatically creating event-based queries in a graphical user interface, comprising:

providing at least one predefined expression for determining a time correlation with respect to at least an event condition and a profile condition, wherein the predefined expression comprises a time expression which takes as its value a predefined timestamp representing a time of occurrence of the event condition, and wherein the profile condition is composed on the basis of the predefined expression so that the profile condition defines a time domain;

providing at least one interface screen for specifying query criteria comprising at least the event condition; and providing at least one interface screen for specifying an event profile that defines criteria, comprising at least the profile condition, to be applied to the event condition according to the at least one predefined expression; whereby a query is generated that restricts results returned by execution of the query to those for which the event condition is satisfied within the time domain defined by the profile condition.

2. The method of claim 1, wherein the event profile is a user-defined persistent object, and further comprising retrieving the event profile from storage in response to a user request to apply the event profile to the event condition.

3. The method of claim 1, wherein the event condition and the profile condition each comprise at least one comparison operation and wherein the conditions are connected by logical operators.

4. The method of claim 1, wherein the criteria defined by the event profile comprises a plurality of profile conditions to be applied to the event condition, and wherein each of the plurality of profile conditions has a corresponding predetermined expression for determining a time correlation with respect to the event condition.

5. The method of claim 1, further comprising ANDing the event condition to the profile condition in response to a user-initiated activation a graphical element of the graphical user interface.

6. The method of claim 1, further comprising providing a data abstraction model logically describing physical data and wherein each condition of the event-based queries comprises a logical field corresponding to a rogical field specification of the data abstraction model.

7. The method of claim 1, wherein the profile condition comprises an arithmetic operation.

8. The method of claim 7, wherein the arithmetic operation comprises two or more fields.

9. A method of programmatically providing a user interface for creating queries, comprising:

providing at least one predefined expression for determining a time correlation with respect to at least an event condition and a profile condition; wherein the predefined expression comprises a time expression which takes as its value a predefined timestamp representing a time of occurrence of the event condition, and wherein the profile condition is composed with reference to the predefined expression so that the profile condition defines a time domain; and providing graphical user interface content that defines a graphical user interface, comprising:

(i) at least one interface screen for displaying conditions of a user-defined query, the conditions including at least the event condition; and (ii) a graphical element for initiating a process of applying an event profile to the event condition of the query according to the at least one predefined expression, wherein the event profile defines at least the profile condition, and whereby results returned by execution of the query are restricted to those for which the event condition occurs during the time domain.

10. The method of claim 9, wherein the event condition and the profile condition each comprise at least one comparison operation and wherein the conditions are connected by logical operators.

11. The method of claim 9, wherein applying the event profile to the event condition comprises ANDing the profile condition with the event condition.

12. The method of claim 9, wherein the graphical user interface further comprises one or more screens for allowing a user to define the event condition and one or more screens for allowing the user to define the event profile.

13. The method of claim 9, wherein the event profile is a persistent object predefined by a user and further comprising retrieving the event profile from storage when the process of applying is initiated.

14. The method of claim 9, wherein the event profile defines a plurality of conditions to be applied to the event condition, and wherein each of the plurality of conditions has a corresponding predetermined expression for determining a time correlation with respect to the event condition.

15. The method of claim 9, wherein the profile condition comprises an arithmetic operation.

16. The method of claim 15, wherein the arithmetic operation comprises two or more fields.

17. A method of programmatically providing a user interface for creating queries, comprising:

(a) providing a plurality of predefined expressions for determining a time correlation with respect to at least an event condition and a profile condition; wherein each predefined expression comprises a time expression which takes as its value a predefined timestamp representing a time of occurrence of the event condition, and wherein the profile condition is composed with reference to the predefined expression so that the profile condition defines a time domain;

(b) generating graphical user interface (GUI) content defining a first graphical user interface screen comprising a first graphical element for initiating a process of applying an event profile to the event condition of a user-defined query, the event profile defining the profile condition, and whereby results returned by execution of the query are restricted to those for which the event condition and the profile condition are contemporaneously true at any time;

(c) in response to a user event activating the first graphical element. generating GUI content defining a second graphical user Interface screen displaying predefined event profiles available for user selection; and (d) in response to a user selection of the event profile from the second graphical user interface screen:

applying the profile condition to the event condition according to one of the plurality of predetermined expressions, wherein the predetermined expression Is specifically defined for a field of the profile condition; and generating GUI content defining a third graphical user interface screen displaying the query including at least the event condition and the profile condition.

18. The method of claim 17, wherein the event condition and the profile condition each comprise at least one comparison operation and wherein the conditions are connected by logical operators.

19. The method of claim 17, wherein applying the profile condition to the event condition comprises ANDing the profile condition to the event condition.

20. The method of claim 17, wherein the graphical user interface further comprises one or more screens for allowing a user to define the event condition and a different one or more screens for allowing the user to define the event profile.

21. The method of claim 17, wherein executing the user-defined query comprises first transforming the user-defined query from an abstract representation to an executable representation.

22. The method of claim 21, wherein each condition of the user,defined query comprises a logical field corresponding to a logical field specification of a data abstraction model logically describing physical data, and wherein transforming comprises accessing the data abstraction model.

23. The method of claim 17, wherein the profile condition comprises an arithmetic operation.

24. The method of claim 23, wherein the arithmetic operation comprises two or more fields.

25. A computer-readable storage medium containing a program which, when executed by a processor, performs an operation of programmatically providing a user interface for creating at least event-based queries, the operation comprising:
  providing graphical user interface content which defines a graphical user interface, comprising:
    (i) at least one region for creating elements of a user-defined query, the elements comprising an event condition and a profile condition, wherein the profile condition is a condition of an event profile and wherein the profile condition is composed with reference to a predefined time correlation expression which takes as a value a predefined timestamp representing a time of occurrence of the event condition so that the profile condition defines a time domain specific to the event condition; and
    (ii) a graphical element for initiating a process of applying the event profile to the event condition;
  receiving an event corresponding to user activation of the graphical element for initiating the process of applying the event profile to the event condition; and
  in response to the event:
    retrieving the predefined time correlation expression; and
    applying the profile condition to the event condition according to the predefined time correlation expression, whereby the query is generated which, when executed, returns results limited to those which satisfy the event condition during the time domain defined by the profile condition.

26. The computer-readable storage medium of claim 25, wherein the profile condition comprises at least one of a comparison operation and a logical operator.

27. The computer-readable storage medium of claim 25, wherein the graphical element is a button.

28. The computer-readable storage medium of claim 25, wherein the event condition and the profile condition each comprise at least one comparison operation and wherein the conditions are connected by logical operators.

29. The computer-readable storage medium of claim 25, wherein applying the event profile to the event condition comprises ANDing the profile condition with the event condition.

30. The computer-readable storage medium of claim 25, wherein the region further comprises one or more screens for allowing a user to define the event condition and one or more screens for allowing the user to define the event profile.

31. The computer-readable storage medium of claim 25, wherein the event profile is a user-defined persistent object.

32. The computer-readable storage medium of claim 25, wherein executing the user-defined query comprises first transforming the user-defined query from an abstract representation to an executable representation.

33. The computer-readable storage medium of claim 25, wherein the predefined time correlation expression is specifically defined for a field of the profile condition.

34. The computer-readable storage medium of claim 33, wherein the predefined expression calculates a value for the field of the profile condition using the timestamp.

35. The computer readable storage medium of claim 25, wherein the profile condition comprises an arithmetic operation.

36. The computer readable storage medium of claim 35, wherein the arithmetic operation comprises two or more fields.

37. A computer-readable storage medium containing a program which, when executed by a processor, performs an operation of programmatically providing a user interface for creating queries, the operation comprising:
  (a) providing a plurality of predefined expressions for determining a time correlation with respect to at least an event condition and a profile condition of a user-defined query, wherein the predefined expressions take as their respective values a predefined timestamp representing a time of occurrence of the event condition, the profile condition being defined by an event profile, and wherein the profile condition is composed with reference to one or more of the predefined expressions so that the profile condition defines a time domain for the event condition;
  (b) generating graphical user interface (GUI) content defining a first graphical user interface screen comprising a first graphical element for initiating a process of applying the event profile to the event condition;
  (c) in response to a user event activating the first graphical element, generating GUI content defining a second graphical user interface screen displaying predefined event profiles available for user selection; and
  (d) in response to a user selection of the event profile from the second graphical user interface screen:
    applying the event condition to the profile condition according to the referenced one or more predetermined expressions, wherein the predetermined expressions are specifically defined for a field of the event condition, whereby the query is generated which, when executed, returns results limited to those which satisfy the event condition during the time domain defined by the profile condition; and
    generating GUI content defining a third graphical user interface screen displaying the query including at least the event condition and the profile condition.

38. The computer-readable storage medium of claim 37, wherein the profile condition comprises at least one of a comparison operation and a logical operator.

39. The computer-readable storage medium of claim 37, wherein the event condition and the profile condition each comprise at least one comparison operation and wherein the conditions are connected by logical operators.

40. The computer-readable storage medium of claim 37, wherein applying the event profile to the event condition comprises ANDing the event condition with the profile condition.

41. The computer-readable storage medium of claim 37, wherein the graphical user interface further comprises one or more screens for allowing a user to define the event condition and one or more screens for allowing the user to define the event profile.

42. The computer-readable storage medium of claim 37, further comprising executing the query in response to a user selection of a second graphical element defined in the third graphical user interface screen.

43. The computer readable storage medium of claim 37, wherein the profile condition comprises en arithmetic operation.

44. The computer readable storage medium of claim 43, wherein the arithmetic operation comprises two or more fields.

45. A computer, comprising:
a memory containing at least:
   a graphical user interface for building queries;
   an event profile defining a profile condition;
   at least one predefined time correlation expression, wherein the predefined time correlation expression comprises a time expression which takes as its value a timestamp representing a time of occurrence of an event condition and wherein the profile condition is composed with reference to the predefined expression so that the profile condition defines a time domain for the event condition; and
a processor communicably connected to the memory and which performs an operation comprising:
   providing graphical user interface content defining the graphical user interface, the content comprising:
      (a) a region for creating conditions of a user-defined query. Including an event condition and the profile condition; and
      (b) a graphical element for initiating a process of applying the event profile to the event condition;
   receiving an event corresponding to user activation of the graphical element for initiating the process of applying the event profile to the event condition; and
   in response to the event:
      (c) retrieving the predefined time correlation expression; and
      (d) applying the profile condition to the event condition according to the predefined time correlation expression, whereby the query is generated which, when executed, returns results limited to those which satisfy the event condition during the time domain defined by the profile condition.

46. The computer of claim 45, wherein the processor uses the predefined time correlation expression to calculate a value for the profile condition using the timestamp.

47. The computer of claim 45, wherein the predefined time correlation expression is specifically defined for a field of the profile.

48. The computer of claim 45, wherein the predefined expression calculates a value for the field of the profile condition using the timestamp corresponding to the event condition.

49. The computer of claim 45, wherein the profile condition comprises an arithmetic operation.

50. The computer of claim 49, wherein the arithmetic operation comprises two or more fields.

51. A graphical user interface to a search capability of a database, comprising:
   a first graphical element for creating an event condition;
   a second graphical element for creating an event profile, the event profile comprising a profile condition and a selection of a predefined expression for determining a time correlation between the profile condition and the event condition, wherein the predefined expression comprises a time expression which takes as its value a predefined timestamp representing a time of occurrence of the event condition, and wherein the profile condition is composed with reference to the predefined expression so that the profile condition defines a time domain; and
   a third graphical element for initiating application of the profile condition to the event condition according to the selected predefined expression, whereby the query is generated which, when executed, returns results limited to those which satisfy the event condition during the time domain defined by the profile condition.

52. The graphical user interface of claim 51, wherein the profile condition is user-specified and the predefined expression is programmatically selected.

53. The graphical user interface of claim 51, wherein the profile condition comprises a predefined field specification and a user-specified value and wherein the predefined field specification has a programmatically defined relationship with the predefined expression.

54. The graphical user interface of claim 51, wherein, for a given record in the database satisfying the event condition, the predefined expression determines a temporal proximity to a field of the profile condition.

55. The graphical user interface of claim 51, wherein the profile condition comprises an arithmetic operation.

56. The graphical user Interface of claim 55, wherein the arithmetic operation comprises two or more fields.

57. A method of programmatically generating event based search queries in a graphical user interface, comprising
   receiving an event condition;
   receiving an event profile, the event profile being a predefined object comprising at least one profile condition based on a predefined expression, which takes as a value a timestamp of each record in a database satisfying the event condition; and
   applying the profile condition to the event condition according to the selected predefined expression to generate a query which, when executed, returns results limited to those which satisfy the event condition during a time domain defined by the profile condition.

58. The method of claim 57, wherein the profile condition comprises an arithmetic operation.

59. The method of claim 58, wherein the arithmetic operation comprises two or more fields.

* * * * *